United States Patent
Yuan et al.

(10) Patent No.: US 11,517,886 B2
(45) Date of Patent: *Dec. 6, 2022

(54) MODIFIED Y-TYPE MOLECULAR SIEVE, CATALYTIC CRACKING CATALYST COMPRISING THE SAME, ITS PREPARATION AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Shuai Yuan, Beijing (CN); Lingping Zhou, Beijing (CN); Huiping Tian, Beijing (CN); Zhenyu Chen, Beijing (CN); Weilin Zhang, Beijing (CN); Hao Sha, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 49 days.

This patent is subject to a terminal disclaimer.

(21) Appl. No.: 17/256,938

(22) PCT Filed: Jun. 27, 2019

(86) PCT No.: PCT/CN2019/093250
§ 371 (c)(1),
(2) Date: Dec. 29, 2020

(87) PCT Pub. No.: WO2020/001531
PCT Pub. Date: Jan. 2, 2020

(65) Prior Publication Data
US 2021/0252490 A1    Aug. 19, 2021

(30) Foreign Application Priority Data

Jun. 29, 2018 (CN) .......................... 201810713533.2
Jun. 29, 2018 (CN) .......................... 201810713603.4
Jun. 29, 2018 (CN) .......................... 201810714440.1
Jun. 29, 2018 (CN) .......................... 201810715455.X

(51) Int. Cl.
*B01J 29/08*   (2006.01)
*C10G 11/05*   (2006.01)
*B01J 35/00*   (2006.01)
*B01J 35/10*   (2006.01)
*B01J 37/00*   (2006.01)
(Continued)

(52) U.S. Cl.
CPC .......... *B01J 29/084* (2013.01); *B01J 35/002* (2013.01); *B01J 35/0006* (2013.01); *B01J 35/0033* (2013.01); *B01J 35/1038* (2013.01); *B01J 37/0009* (2013.01); *B01J 37/04* (2013.01); *B01J 37/06* (2013.01); *B01J 37/10* (2013.01); *B01J 37/30* (2013.01); *C10G 11/05* (2013.01); *B01J 2229/16* (2013.01); *B01J 2229/186* (2013.01); *B01J 2229/32* (2013.01); *B01J 2229/36* (2013.01); *B01J 2229/42* (2013.01); *C10G 2300/202* (2013.01); *C10G 2300/301* (2013.01); *C10G 2300/302* (2013.01); *C10G 2300/308* (2013.01); *C10G 2300/70* (2013.01)

(58) Field of Classification Search
CPC .... B01J 29/084; B01J 35/002; B01J 35/1038; B01J 37/04; B01J 37/10; B01J 37/30; C10G 11/05
See application file for complete search history.

(56) References Cited

U.S. PATENT DOCUMENTS

| 4,198,319 A | 4/1980 | Alafandi et al. |
| 4,273,753 A | 6/1981 | Chang |

(Continued)

FOREIGN PATENT DOCUMENTS

| CA | 891483 A | 1/1972 |
| CN | 1194941 A | 10/1998 |

(Continued)

OTHER PUBLICATIONS

English machine translation of CN 102029177, obtained from Google patents (Year: 2011).*
English machine translation of CN 1194941, obtained from Google patents (Year: 1998).*
English machine translation of CN 1388064, obtained from Google patents (Year: 2003).*

(Continued)

*Primary Examiner* — Renee Robinson
(74) *Attorney, Agent, or Firm* — Novick, Kim & Lee, PLLC; Allen Xue

(57) ABSTRACT

A modified Y-type molecular sieve has a modifying metal content of about 0.5-6.3 wt % calculated on the basis of an oxide of the modifying metal and a sodium content of no more than about 0.5 wt % calculated on the basis of sodium oxide. The modifying metal is magnesium and/or calcium. The modified Y-type molecular sieve has a proportion of non-framework aluminum content to the total aluminum content of no more than about 20%, a total pore volume of about 0.33-0.39 ml/g, a proportion of the pore volume of secondary pores having a pore size of 2-100 nm to the total pore volume of about 10-25%, a lattice constant of about 2.440-2.455 nm, a lattice collapse temperature of not lower than about 1040° C., and a ratio of B acid to L acid in the total acid content of no less than about 2.30.

20 Claims, No Drawings

(51) Int. Cl.
*B01J 37/04* (2006.01)
*B01J 37/06* (2006.01)
*B01J 37/10* (2006.01)
*B01J 37/30* (2006.01)

(56) References Cited

U.S. PATENT DOCUMENTS

| | | |
|---|---|---|
| 4,429,053 A | 1/1984 | Ward |
| 4,438,178 A | 3/1984 | Powers |
| 4,584,287 A | 4/1986 | Ward |
| 4,750,988 A | 6/1988 | Mitchell et al. |
| 5,206,194 A | 4/1993 | Clark |
| 5,340,957 A | 8/1994 | Clark |
| 5,925,235 A | 7/1999 | Habib |
| 9,889,439 B2 | 2/2018 | Gao et al. |
| 2015/0011378 A1 | 1/2015 | Gao et al. |
| 2015/0111722 A1 | 4/2015 | Long et al. |

FOREIGN PATENT DOCUMENTS

| | | |
|---|---|---|
| CN | 1382525 A | 12/2002 |
| CN | 1382631 A | 12/2002 |
| CN | 1388064 A | 1/2003 |
| CN | 1566273 A | 1/2005 |
| CN | 1566276 A | 1/2005 |
| CN | 1683244 A | 10/2005 |
| CN | 102020289 A | 4/2011 |
| CN | 102029177 A | 4/2011 |
| RU | 2621345 C1 | 6/2017 |

OTHER PUBLICATIONS

English machine translation of CN 1683244, obtained from Google patents (Year: 2005).*

* cited by examiner

MODIFIED Y-TYPE MOLECULAR SIEVE, CATALYTIC CRACKING CATALYST COMPRISING THE SAME, ITS PREPARATION AND APPLICATION THEREOF

CROSS REFERENCE TO RELATED APPLICATIONS

The present application is a U.S. national phase entry of International Application No. PCT/CN2019/093250, filed on Jun. 27, 2019, which claims the priority of Chinese patent application No. 201810713603.4, titled "Modified Y-type molecular sieve with high stability for improving the production of branched hydrocarbons, and preparation thereof", filed on Jun. 29, 2018; the priority of Chinese patent application No. 201810714440.1, titled "Catalytic cracking catalyst, its preparation and application thereof", filed on Jun. 29, 2018; the priority of Chinese patent application No. 201810715455.X, titled "Catalytic cracking catalyst", filed on Jun. 29, 2018; and the priority of Chinese patent application No. 201810713533.2, titled "Modified Y-type molecular sieve with highly stability for improving the production of dimethyl-branched hydrocarbons and preparation thereof", filed on Jun. 29, 2018, which are incorporated herein by reference in their entireties.

TECHNICAL FIELD

The present application relates to the technical field of molecular sieves and catalytic cracking, in particular to a modified Y-type molecular sieve, a catalytic cracking catalyst comprising the same, its preparation and application thereof.

BACKGROUND ART

At present, high-silica Y-type molecular sieves (also referred to as Y-type zeolites) are mainly produced via the hydrothermal method in industry. The hydrothermal method is the most commonly used method for preparing high-silica Y-type molecular sieves, in which a NaY molecular sieve is subjected to multiple times of rare earth ion exchange and high-temperature roasting, so as to obtain a rare earth-containing high-silica Y-type molecular sieve. However, rare earth-containing high-silica Y-type molecular sieves prepared via the hydrothermal method have the following defects: because the structure of the molecular sieve may be damaged under the severe conditions for hydrothermal treatment, Y-type molecular sieves with high silica-alumina ratio can hardly be obtained; although the generation of non-framework aluminum is beneficial to improving the stability of the molecular sieve and forming new acid centers, an excessive amount of non-framework aluminum may reduce the selectivity of the molecular sieve; in addition, many dealuminized voids in the molecular sieve may not be timely supplemented by silicon migrated from the framework, so that lattice defects may be generated in the molecular sieve, and the crystallinity retention of the molecular sieve is low. Besides, since conventional Y molecular sieves only comprise rare earth, silicon, aluminum and some other elements, the adjustment of their structure and performances is limited to a certain extent, so that the composition of a product is normally stabilized within a certain range. Consequently, rare earth-containing high-silica Y-type molecular sieves prepared by the hydrothermal method show poor thermal and hydrothermal stability, which is reflected by their low lattice collapse temperature, low crystallinity retention and specific surface area after hydrothermal aging, and poor selectivity.

In the method disclosed in U.S. Pat. Nos. 4,584,287 and 4,429,053, a NaY molecular sieve is first subjected to ion exchange with rare earth and then treated with steam, which makes the dealumination of the molecular sieve during the steam treatment difficult due to the shielding and supporting effect of the rare earth ion. The lattice parameter of the molecular sieve is increased to 2.465-2.475 nm before the steam treatment and is 2.420-2.464 nm after the treatment, and the temperature required for reducing the lattice parameter is relatively high (593-733° C.).

In the method disclosed in U.S. Pat. Nos. 5,340,957 and 5,206,194, a NaY molecular sieve having a $SiO_2/Al_2O_3$ ratio of 6.0 is used as a starting material, and the NaY is also subjected to rare earth ion exchange, and then to a hydrothermal treatment. Thus, the method also has the defect of the aforementioned U.S. Pat. Nos. 4,584,287 and 4,429,053.

Another method for preparing high-silica Y-type molecular sieves is the gas phase chemical method, which is another important method for preparing high-silica molecular sieves first reported by Beyer and Mankui in 1980. The gas phase chemical method generally involves the reaction of $SiCl_4$ and anhydrous NaY molecular sieve under the protection of nitrogen at a certain temperature. The whole reaction process fully utilizes the external Si source provided by $SiCl_4$, and the dealuminization and silicon supplementing reaction can be completed at one time through isomorphous substitution. U.S. Pat. Nos. 4,273,753 and 4,438,178, and Chinese patent application Nos. CN1382525A, CN1194941A, CN1683244A disclose a method for preparing ultra-stable Y-type molecular sieves by gas phase chemical dealumination with $SiCl_4$. However, gas phase ultra-stabilized molecular sieves have substantially no secondary pores.

In addition, the content of branched hydrocarbons in the gasoline produced using catalysts prepared from conventional Y molecular sieves is stabilized in a certain range and is difficult to be increased. This limits the improvement in the quality of catalytically cracked gasoline and lowers the competitiveness of catalytically cracked gasoline product.

Huayuan Zhu et al. (Acta Petrolei Sinica (Petroleum Processing Section), 2001, 17 (6): 6-10) has studied the influence of magnesium-containing modified molecular sieves on the performance of FCC catalysts, and reported that FCC catalysts based on Mg, Ca-containing molecular sieves show strong capability for heavy oil conversion, high activity for hydrogen transfer reaction and higher productivity of isobutane. However, the Y-type molecular sieve prepared by the method disclosed in this document has poor thermal and hydrothermal stability, and can only be used to increase the isobutane production under certain conditions. In addition, such Y-type molecular sieve cannot be effectively used to increase the content of branched hydrocarbons in gasoline, and can hardly be used to increase the ratio of dimethyl-branched hydrocarbons/monomethyl-branched hydrocarbons.

The performance of ultra-stable molecular sieves prepared by the hydrothermal method or the gas phase method known in prior arts cannot satisfy current needs for processing heavy oils and inferior oils and improving the quality of gasoline. Moreover, when catalytic cracking catalysts based on existing Y-type molecular sieves are used for heavy oil cracking, the content of branched hydrocarbons in the gasoline product obtained is relatively low.

The above description is provided merely as background of the present application, and is not admitted in any manner as prior art published before the filing date of the present application.

SUMMARY OF THE INVENTION

An object of the present application is to provide a highly stable modified Y-type molecular sieve, its preparation and application thereof, which is useful in catalytic cracking of heavy oils and can improve the production of branched hydrocarbons. Another object of the present application is to provide a catalytic cracking catalyst comprising the modified Y-type molecular sieve, its preparation and application thereof, wherein, when used for heavy oil catalytic cracking, the catalyst shows low coke selectivity, high gasoline yield and high liquefied gas yield, and the resulted gasoline product has an increased content of branched hydrocarbons.

To achieve the above objects, in an aspect, the present application provides a modified Y-type molecular sieve having a modifying metal content of about 0.5-6.3 wt % calculated on the basis of an oxide of the modifying metal and a sodium content of no more than about 0.5 wt %, preferably about 0.1-0.5 wt %, calculated on the basis of sodium oxide, on a dry basis and based on the weight of the modified Y-type molecular sieve, the modifying metal being magnesium and/or calcium, wherein the modified Y-type molecular sieve has a proportion of non-framework aluminum content to the total aluminum content of no more than about 20%, a total pore volume of about 0.33-0.39 ml/g, a proportion of the pore volume of secondary pores having a pore size of 2-100 nm to the total pore volume of about 10-25%, a lattice constant of about 2.440-2.455 nm, a lattice collapse temperature of not lower than about 1040° C., and a ratio of B acid to L acid in the total acid content of no less than about 2.30, as determined by pyridine adsorption infrared spectroscopy at 200° C.

In another aspect, the present application provides a method for preparing a modified Y-type molecular sieve, comprising the steps of:

(1) contacting a NaY molecular sieve with a solution of a soluble magnesium salt and/or soluble calcium salt for ion exchange reaction to obtain a Y-type molecular sieve comprising magnesium and/or calcium with reduced sodium content;

(2) subjecting the Y-type molecular sieve obtained in the step (1) to roasting at a temperature of about 350-480° C. in an atmosphere of about 30-90 vol % of steam for about 4.5-7 hours, and optionally drying, to obtain a Y-type molecular sieve with reduced lattice constant; and (3) contacting the Y-type molecular sieve obtained in the step (2) with gaseous silicon tetrachloride for reaction at a weight ratio of $SiCl_4$ to the Y-type molecular sieve with reduced lattice constant on a dry basis ranging from about 0.1:1 to about 0.7:1 and a reaction temperature of about 200-650° C. for a reaction time of about 10 minutes to about 5 hours, to obtain the modified Y-type molecular sieve.

In another aspect, the present application provides a modified Y-type molecular sieve obtained by the method for preparing the modified Y-type molecular sieve as described above.

In yet another aspect, the present application provides a catalytic cracking catalyst comprising about 10-50 wt %, on a dry basis, of the modified Y-type molecular sieve according to the present application, about 10-40 wt % of an alumina binder calculated on the basis of alumina, and about 10-80 wt %, on a dry basis, of a clay, based on the weight of the catalytic cracking catalyst.

In yet another aspect, the present application provides the use of a modified Y-type molecular sieve according to the present application in catalytic cracking of hydrocarbon oils, comprising a step of contacting a hydrocarbon oil with a catalytic cracking catalyst comprising the modified Y-type molecular sieve.

The modified Y-type molecular sieve according to the present application has high thermal and hydrothermal stability, and, when used as an active component in a catalytic cracking catalyst for heavy oil catalytic cracking, can provide a lower coke selectivity and a higher gasoline and liquefied gas yield, as well as a higher content of branched hydrocarbons in the resulted gasoline, as compared to existing Y-type molecular sieves. When the modifying metal contained is magnesium, the resulted gasoline shows a higher content of monomethyl-branched hydrocarbons, and when the modifying metal contained is calcium, the resulted gasoline shows a higher content of dimethyl-branched hydrocarbons.

Besides the use as an active component in a catalytic cracking catalyst, the modified Y-type molecular sieve according to the present application can also be used as a carrier in a lubricating oil isodewaxing catalyst, and, when used in the isomerization process of lubricating oils, the isodewaxing catalyst comprising the molecular sieve as a carrier shows good isomerization performance and high stability.

The method for preparing the modified Y-type molecular sieve according to the present application can produce high-silica Y-type molecular sieves with high crystallinity, high thermal stability and high hydrothermal stability, and a certain secondary pore structure, which has a uniform aluminum distribution and less non-framework aluminum content. When, used for conversion of heavy oils, the modified Y-type molecular sieve can provide a good coke selectivity, a high heavy oil cracking activity, an improved yield of gasoline, liquefied gas and total liquid, and an increased content of branched hydrocarbons in gasoline.

The catalytic cracking catalyst according to the present application comprising the modified Y-type molecular sieve as an active component has high thermal and hydrothermal stability, and, when used for catalytic cracking of heavy oil, shows higher activity stability and lower coke selectivity, and can provide a higher yield of gasoline, liquefied gas, light oil and total liquid, and a higher content of branched hydrocarbons in the resulted gasoline, as compared to existing catalytic cracking catalysts comprising Y-type molecular sieves.

DETAILED DESCRIPTION OF THE INVENTION

The present application will now be described in further detail with reference to embodiments thereof, and it should be noted that the embodiments described herein are merely provided for the purpose of illustrating and explaining the present application, while are not intended to be restrictive in any manner.

Any numerical value (including the end values of numerical ranges) provided herein is not limited to the precise value recited, but should be interpreted as covering any value close to said precise value, such as all possible values within 5% of said precise value. Moreover, for any numerical range provided herein, one or more new numerical ranges can be obtained by arbitrarily combining the end values of the range, an end value with a specific value provided within the range, or various specific values provided within the range. Such new numerical ranges should also be considered as being specifically disclosed herein.

Unless otherwise indicated, all terms used herein have the same meaning as commonly understood by those skilled in the art, and where the definition of a term provided herein is different from the ordinary understanding in the art, the definition provided herein shall prevail.

In the present application, except for those explicitly stated, any matter or matters not mentioned are directly applicable to those known in the art without any change. Moreover, any of the embodiments described herein can be freely combined with one or more of other embodiments described herein, and the resulted technical solution or technical idea should be considered as a part of the original disclosure or original description of the present application, while should not be considered as a new matter that has not been disclosed or anticipated herein, unless it is apparent to those skilled in the art that such a combination is obviously unreasonable.

The RIPP test methods involved in the present application can be found in "Petrochemical Analysis Methods (RIPP Test Methods)", edited by Cuiding YANG et al., Science Press, September 1990, First Edition, ISBN: 7-03-001894-X, pages 263-268, 412-415 and 424-426, which is incorporated herein by reference in its entirety.

All patent and non-patent literatures mentioned herein, including but not limited to textbooks and journal articles, are hereby incorporated by reference in their entireties.

As used herein, the term "branched hydrocarbon(s)" refers to isoparaffins and branched alkenes. The increase of the content of branched hydrocarbons is beneficial to improving the quality of the gasoline, for example, by retaining the octane number of the gasoline while the content of aromatic hydrocarbons and olefins being reduced.

As used herein, the term "dimethyl-branched hydrocarbon(s)" refers to branched hydrocarbons comprising two methyl side groups along the carbon chain, while the term "monomethyl-branched hydrocarbons" refers to branched hydrocarbons comprising one methyl side group along the carbon chain. The increase of the content of the dimethyl-branched hydrocarbons can improve the quality of FCC gasoline, for example, by retaining a high octane number of the gasoline while the content of olefins and aromatic hydrocarbons being reduced.

As used herein, the expression "Y-type molecular sieve having a normal lattice constant" means that the lattice constant of the Y-type molecular sieve is within the range of the lattice constant of conventional NaY molecular sieves, which is preferably in a range of about 2.465 nm to about 2.472 nm.

As used herein, the term "atmospheric pressure" means a pressure of about 1 atm.

As used herein, the weight, on a dry basis, of a material refers to the weight of the solid product obtained after calcining the material at 800° C. for 1 hour.

In the present application, the terms "Y-type molecular sieve" and "Y-type zeolite" are used interchangeably, and the terms "NaY molecular sieve" and "NaY zeolite" are also used interchangeably.

In a first aspect, the present application provides a modified Y-type molecular sieve having a modifying metal content of about 0.5-6.3 wt % calculated on the basis of an oxide of the modifying metal and a sodium content of no more than about 0.5 wt %, preferably about 0.1-0.5 wt %, calculated on the basis of sodium oxide, on a dry basis and based on the weight of the modified Y-type molecular sieve, the modifying metal being magnesium and/or calcium, wherein the modified Y-type molecular sieve has a proportion of non-framework aluminum content to the total aluminum content of no more than about 20%, a total pore volume of about 0.33-0.39 ml/g, a proportion of the pore volume of secondary pores with a pore size (i.e. pore diameter) of 2-100 nm to the total pore volume of about 10-25%, a lattice constant of about 2.440-2.455 nm, a lattice collapse temperature (also referred to as structure collapse temperature) of not lower than about 1040° C., and a ratio of B acid to L acid in the total acid content of no less than about 2.30, as determined by pyridine adsorption infrared spectroscopy at 200° C.

In some preferred embodiments, the modified Y-type molecular sieve has no absorption peak at a wavelength of 285-295 nm in its UV-Vis absorption spectrum.

In some preferred embodiments, the modifying metal is magnesium and the modified Y-type molecular sieve has a magnesium content, calculated on the basis of magnesium oxide, of about 0.5-4.5 wt %, preferably about 0.6-4.3 wt %, for example about 0.8-4.5 wt %, about 1-4.5 wt % or about 1.2-4.3 wt %.

In other preferred embodiments, the modifying metal is calcium and the modified Y-type molecular sieve has a calcium content, calculated on the basis of calcium oxide, of about 0.7-6.3 wt %, preferably about 0.9-5.9 wt %, for example about 1.5-6 wt % or about 0.7-4.3 wt %.

In a preferred embodiment, the modified Y-type molecular sieve has a sodium content, calculated on the basis of sodium oxide, of about 0.15-0.5 wt %, for example about 0.2-0.5 wt %, about 0.30-0.5 wt %, about 0.35-0.48 wt %, or about 0.3-0.46 wt %.

In a preferred embodiment, the modified Y-type molecular sieve according to the present application is substantially free of modifying ions or elements other than magnesium and calcium, including but not limited to P, rare earth, Ga, Cr, Zn, Cu, and the like. For example, each of the modifying ions or elements other than magnesium and calcium is present in an amount (calculated on the basis of oxides) of less than about 0.1 wt %, such as less than about 0.05 wt % or less than about 0.01 wt %, based on the dry weight of the modified Y-type molecular sieve.

In a preferred embodiment, the modified Y-type molecular sieve has a proportion of the pore volume of secondary pores having a pore size of 2-100 nm to the total pore volume of about 15-21%, for example about 17-21%.

In a preferred embodiment, the modified Y-type molecular sieve has a proportion of non-framework aluminum content to the total aluminum content of about 13-19%.

In a further preferred embodiment, the modified Y-type molecular sieve is a high-silica Y-type molecular sieve, which has a framework silica-alumina ratio, calculated as $SiO_2/Al_2O_3$ molar ratio, of about 7.3-14.0, for example about 8.4-12.6, about 8.0-12.6, or about 8.1-12.

In a preferred embodiment, the modified Y-type molecular sieve has a lattice constant of about 2.442-2.452 nm, for example about 2.442-2.450 nm.

In a preferred embodiment, the modified Y-type molecular sieve has a lattice collapse temperature of about 1040-1080° C., for example about 1045-1080° C., about 1041-1055° C., about 1047-1058° C., about 1057-1075° C. or about 1047-1065° C.

In a preferred embodiment, the modified Y-type molecular sieve has a ratio of B acid to L acid in the total acid content of about 2.3-5.0, preferably about 2.4-4.2, for example about 2.4-3.5, as determined by pyridine adsorption infrared spectroscopy at 200° C.

In a preferred embodiment, the modified Y-type molecular sieve has a relative crystalline retention of about 33% or greater, for example about 33-48%, about 33-45%, about 35-45%, about 36-40%, or about 39-45%, after aging at 800° C. under atmospheric pressure in a 100% steam atmosphere for 17 hours.

In a preferred embodiment, the modified Y-type molecular sieve has a relative crystallinity of no less than about 58%, for example about 58-75%, about 58-70%, about 59-70%, about 58-68%, about 59-68%, about 59-64%, or about 59-63%.

In a preferred embodiment, the modified Y-type molecular sieve has a specific surface area of about 620-670 m²/g, for example about 630-660 m²/g.

In a preferred embodiment, the modified Y-type molecular sieve has a total pore volume of about 0.35-0.39 ml/g, for example about 0.35-0.375 ml/g or about 0.355-0.375 ml/g.

In a preferred embodiment, the modified Y-type molecular sieve has a micropore volume of about 0.25-0.35 ml/g, for example about 0.26-0.32 ml/g.

In some particularly preferred embodiments, the modifying metal is magnesium and the modified Y-type molecular sieve has a magnesium content, calculated on the basis of magnesium oxide, of about 0.6-4.3 wt %, preferably about 0.8-4.5 wt %; a sodium content of about 0.15-0.5 wt %, preferably about 0.30-0.5 wt %, calculated on the basis of sodium oxide; a lattice constant of about 2.442-2.452 nm and a framework silica-alumina ratio of about 8.4-12.6.

In other particularly preferred embodiments, the modifying metal is calcium and the modified Y-type molecular sieve has a calcium content, calculated on the basis of calcium oxide, of about 0.7-6.3 wt %, preferably about 0.9-5.9 wt %; a sodium content of about 0.15-0.5 wt %, preferably about 0.2-0.5 wt %, calculated on the basis of sodium oxide; a lattice constant of about 2.442-2.452 nm and a framework silica-alumina ratio of about 8.0-12.6.

In a preferred embodiment, the modified Y-type molecular sieve has an O1s electron binding energy of no greater than about 532.55 eV, for example, about 532.39-532.52 eV.

In a preferred embodiment, the modified Y-type molecular sieve according to the present application is obtained by a method for preparing a modified Y-type molecular sieve that will be described hereinbelow.

In a second aspect, the present application provides a method for preparing a modified Y-type molecular sieve, comprising the steps of:

(1) contacting a NaY molecular sieve with a solution of a soluble magnesium salt and/or soluble calcium salt for ion exchange reaction to obtain a Y-type molecular sieve comprising magnesium and/or calcium with reduced sodium content;

(2) subjecting the Y-type molecular sieve obtained in the step (1) to roasting at a temperature of about 350-480° C. in an atmosphere of about 30-90 vol % of steam for about 4.5-7 hours, and optionally drying, to obtain a Y-type molecular sieve with reduced lattice constant; and (3) contacting the Y-type molecular sieve obtained in the step (2) with gaseous silicon tetrachloride for reaction at a weight ratio of $SiCl_4$ to the Y-type molecular sieve with reduced lattice constant on a dry basis ranging from about 0.1:1 to about 0.7:1 and a reaction temperature of about 200-650° C. for a reaction time of about 10 minutes to about 5 hours, to obtain the modified Y-type molecular sieve.

In some embodiments, the method according to the present application comprises the steps of:

(1) contacting a NaY molecular sieve with a solution of a soluble magnesium salt and/or soluble calcium salt for ion exchange reaction, filtering, washing, and optionally drying, to obtain a Y-type molecular sieve comprising magnesium and/or calcium and having a normal lattice constant and reduced sodium content;

(2) subjecting the Y-type molecular sieve obtained in the step (1) to roasting at a temperature of about 350-480° C. in an atmosphere of about 30-90 vol % of steam for about 4.5-7 hours, and optionally drying, to obtain a Y-type molecular sieve with reduced lattice constant;

(3) contacting the Y-type molecular sieve obtained in the step (2) with gaseous silicon tetrachloride for reaction at a weight ratio of $SiCl_4$ to the Y-type molecular sieve with reduced lattice constant on a dry basis ranging from about 0.1:1 to about 0.7:1 and a reaction temperature of about 200-650° C. for a reaction time of about 10 minutes to about 5 hours, washing and filtering, to obtain the modified Y-type molecular sieve.

In the method for preparing the modified Y-type molecular sieve according to the present application, the NaY molecular sieve is subjected to an ion exchange reaction with a solution of a soluble magnesium salt and/or soluble calcium salt in step (1) to obtain a Y-type molecular sieve having a normal lattice constant and reduced sodium content. The NaY molecular sieve may be commercially available or prepared according to existing methods. In a preferred embodiment, the NaY molecular sieve has a lattice constant of about 2.465-2.472 nm, a framework silica-alumina ratio ($SiO_2/Al_2O_3$ molar ratio) of about 4.5-5.2, a relative crystallinity of about 85% or greater, for example about 85-95%, and a sodium content of about 13.0-13.8 wt % calculated on the basis of sodium oxide.

In a preferred embodiment, the Y-type molecular sieve obtained in step (1) has a lattice constant of about 2.465-2.472 nm and a sodium content of no more than about 9 wt %, for example no more than about 8.8 wt %, calculated on the basis of sodium oxide.

In a preferred embodiment, the step (1) further comprises washing the resulted Y-type molecular sieve to wash away the exchanged sodium ions, for example, with deionized water or decationized water.

In a preferred embodiment, the Y-type molecular sieve obtained in step (1) has a magnesium content of about 0.5-7.0 wt % calculated on the basis of MgO, a sodium content of about 4-8.8 wt % calculated on the basis of sodium oxide, and a lattice constant of about 2.465-2.472 nm; or the Y-type molecular sieve obtained in the step (1) has a calcium content of about 0.7-11 wt % calculated on the basis of CaO, a sodium content of about 4-8.8 wt % calculated on the basis of sodium oxide, and a lattice constant of about 2.465-2.472 nm.

In some particularly preferred embodiments, the magnesium-containing Y-type molecular sieve having a normal lattice constant and reduced sodium content obtained in step (1) has a magnesium content of about 0.6-6.5 wt %, for example about 0.7-6.5 wt % or about 0.75-6.3 wt %, calculated on the basis of MgO; a sodium content of about 5.5-8.5 wt % or about 5-7.5 wt %, calculated on the basis of sodium oxide; and a lattice constant of about 2.465-2.472 nm; or the calcium-containing Y-type molecular sieve having a normal lattice constant and reduced sodium content obtained in step (1) has a calcium content of about 0.8-10 wt %, for example about 4-10 wt %, about 0.9-9.0 wt %, about 1.5-6 wt % or about 0.7-5.0 wt %, calculated on the basis of CaO; a sodium content of about 4.5-8.5 wt % or about 5-7.5 wt %, calculated on the basis of sodium oxide; and a lattice constant of about 2.465-2.472 nm.

In a preferred embodiment, in the step (1), the NaY molecular sieve, the soluble magnesium salt and/or calcium salt and water are mixed at a weight ratio of the NaY molecular sieve:the soluble magnesium salt and/or calcium salt (calculated on the basis of MgO and/or CaO):$H_2O$ of about 1:0.005-0.28:5-15, to carry out an ion exchange reaction. For example, in some further preferred embodiments, the weight ratio of the NaY molecular sieve (on a dry basis):the soluble magnesium salt (calculated on the basis of MgO):$H_2O$ is about 1:0.005-0.19:5-15, for example about 1:0.01-0.15:6-12 or about 1:0.05-0.12:6-12; in other further preferred embodiments, the weight ratio of the NaY molecular sieve (on a dry basis):the soluble calcium salt (calculated on the basis of CaO):$H_2O$ is about 1:0.009-0.28:5-15, for example about 1:0.009-0.27:5-15.

In a preferred embodiment, in the step (1), the NaY molecular sieve is mixed with water, and then a soluble magnesium salt, a soluble calcium salt, a solution of a soluble calcium salt and/or a solution of a soluble magnesium salt is added under stirring, to carry out an ion exchange reaction;

the conditions for the ion exchange reaction include: an exchange temperature of about 15-95° C., for example about 65-95° C., and an exchange time of about 30-120 minutes, for example about 45-90 minutes.

In the present application, the soluble magnesium salt may be any magnesium salt soluble in a solvent such as water, for example, one or more of magnesium chloride, magnesium nitrate, magnesium sulfate, preferably magnesium chloride and/or magnesium nitrate. The soluble calcium salt may be any calcium salt soluble in a solvent such as water, preferably calcium chloride and/or calcium nitrate. The soluble magnesium salt solution and the soluble calcium salt solution are preferably aqueous solutions.

In a preferred embodiment, the roasting conditions of step (2) include: a roasting temperature of about 380-470° C., a roasting atmosphere of about 40-80% steam, and a roasting time of about 5-6 hours.

In a preferred embodiment, the steam atmosphere contains about 30-90 vol %, preferably about 40-80 vol %, of steam, and may further contain other gases, such as one or more of air, helium, or nitrogen.

In a preferred embodiment, the Y-type molecular sieve with reduced lattice constant obtained in step (2) has a lattice constant of about 2.450-2.462 nm.

In a preferred embodiment, the step (2) further comprises drying the roasted molecular sieve, so as to obtain a Y-type molecular sieve with reduced lattice constant that has a water content of preferably no more than about 1 wt %.

In a preferred embodiment, in the step (3), the weight ratio of $SiCl_4$:the Y-type molecular sieve (on a dry basis) is about 0.3:1 to about 0.6:1, and the reaction temperature is about 350-500° C.

In a preferred embodiment, the step (3) may further comprise washing the resulted modified Y-type molecular sieve with water. The washing may be carried out by a conventional washing method, using water such as deionized water or decationized water, for the purpose of removing soluble by-products such as $Na^+$, $Cl^-$, $Al^{3+}$ and the like remaining in the molecular sieve. For example, the washing conditions may include: a weight ratio of the washing water to the molecular sieve of about 5-20:1, for example about 6-15:1, a pH of about 2.5-5.0, and a washing temperature of about 30-60° C. Preferably, the washing is carried out to an extent that no free ions like $Na^+$, $Cl^-$ and $Al^{3+}$ can be detected in the spent washing liquid, and normally the content of each of the $Na^+$, $Cl^-$ and $Al^{3+}$ ions in the spent washing liquid is not more than about 0.05 wt %.

In a preferred embodiment, the method for preparing the modified Y-type molecular sieve according to the present application comprises the steps of:

(1) subjecting a NaY molecular sieve to an ion exchange reaction with a solution of a soluble calcium salt, filtering and washing, to obtain a calcium-containing Y-type molecular sieve having a normal lattice constant and reduced sodium content, said ion exchange being carried out under stirring at a temperature of about 15-95° C., preferably about 65-95° C., for about 30-120 minutes, preferably about 45-90 minutes;

(2) subjecting the calcium-containing Y-type molecular sieve having a normal lattice constant and reduced sodium content to roasting at a temperature of about 350-480° C., preferably about 380-470° C., in an atmosphere containing about 30-90 vol %, preferably about 40-80 vol %, of steam for about 4.5-7 hours, preferably about 5-6 hours, and drying, to obtain a Y-type molecular sieve having a reduced lattice constant and a water content of less than about 1 wt %, wherein the lattice constant of the Y-type molecular sieve having a reduced lattice constant is about 2.450-2.462 nm; and (3) contacting the Y-type molecular sieve having a reduced lattice constant and a water content of less than about 1 wt % with a gaseous $SiCl_4$ vaporized by heating for reaction at a weight ratio of $SiCl_4$ to the Y-type molecular sieve having a reduced lattice constant (on a dry basis) of about 0.1:1 to about 0.7:1, preferably about 0.3:1 to about 0.6:1, and a temperature of about 200-650° C., preferably about 350-500° C., for about 10 minutes to about 5 hours, washing and filtering, to obtain the modified Y-type molecular sieve.

In another preferred embodiment, the method for preparing the modified Y-type molecular sieve according to the present application comprises the steps of:

(1) subjecting a NaY molecular sieve to an ion exchange reaction with a solution of a soluble magnesium salt, filtering and washing, to obtain a magnesium-containing Y-type molecular sieve having a normal lattice constant and reduced sodium content, said ion exchange being carried out under stirring at a temperature of about 15-95° C., preferably about 65-95° C., for about 30-120 minutes, preferably about 45-90 minutes;

(2) subjecting the magnesium-containing Y-type molecular sieve having a normal lattice constant and reduced sodium content to roasting at a temperature of about 350-480° C., preferably about 380-470° C., in an atmosphere containing about 30-90 vol %, preferably about 40-80 vol %, of steam for about 4.5-7 hours, preferably about 5-6 hours, and drying, to obtain a Y-type molecular sieve having a reduced lattice constant and a water content of less than about 1 wt %, wherein the lattice constant of the Y-type molecular sieve having a reduced lattice constant is about 2.450-2.462 nm; and (3) contacting the Y-type molecular sieve having a reduced lattice constant and a water content of less than about 1 wt % with a gaseous $SiCl_4$ vaporized by heating for reaction at a weight ratio of $SiCl_4$ to the Y-type molecular sieve having a reduced lattice constant (on a dry basis) of about 0.1:1 to about 0.7:1, preferably about 0.3:1 to about 0.6:1, and a temperature of about 200-650° C., preferably about 350-500° C., for about 10 minutes to about 5 hours, washing and filtering, to obtain the modified Y-type molecular sieve.

In a third aspect, the present application provides a modified Y-type molecular sieve prepared by the method for preparing the modified Y-type molecular sieve according to the present application.

In a fourth aspect, the present application provides a catalytic cracking catalyst comprising about 10-50 wt %, on a dry basis, of the modified Y-type molecular sieve according to the present application, about 10-40 wt % of an alumina binder calculated on the basis of alumina, and about 10-80 wt %, on a dry basis, of a clay, based on the weight of the catalytic cracking catalyst.

In some embodiments, the catalytic cracking catalyst according to the present application may further comprise an additional molecular sieve other than the modified Y-type molecular sieve, and the additional molecular sieve may be present in an amount, on a dry basis, of about 0-40 wt %, for example about 0-30 wt % or about 1-20 wt %, based on the weight of the catalyst. The additional molecule sieve can be selected from various molecular sieves useful in catalytic cracking catalysts, such as one or more of zeolites having MFI structure, Beta zeolite, other Y zeolites, and non-zeolitic molecular sieves. Preferably, the additional Y-type molecular sieve is present in an amount, on a dry basis, of no more than about 40 wt %, for example about 1-40 wt % or about 0-20 wt %. The additional Y-type molecular sieve may be, for example, one or more of REY, REHY, DASY, SOY, and PSRY; the zeolite having MFI structure may be, for example, one or more of HZSM-5, ZRP, and ZSP; the beta zeolite may be, for example, HP zeolite; and the non-zeolitic molecular sieve may be, for example, one or more of aluminum phosphate molecular sieves (AlPO molecular sieves) and silicoaluminophosphate molecular sieves (SAPO molecular sieves).

In the catalytic cracking catalyst according to the present application, the modified Y-type molecular sieve is preferably present in an amount, on a dry basis, of about 15-45 wt %, for example about 25-40 wt %.

In the catalytic cracking catalyst according to the present application, the alumina binder is preferably present in an amount of about 20-35 wt %. According to the present application, the alumina binder may be one or more selected from the group consisting of various forms of alumina, hydrated alumina, and aluminum sol commonly used in catalytic cracking catalysts. For example, it may be one or more selected from the group consisting of γ-alumina, η-alumina, θ-alumina, χ-alumina, pseudoboemite, boehmite, gibbsite, bayerite and aluminum sol, preferably pseudoboehmite and aluminum sol. For example, the catalytic cracking catalyst may comprise about 2-15 wt %, preferably about 3-10 wt %, of an aluminium sol calculated on the basis of alumina, and about 10-30 wt %, preferably about 15-25 wt %, of pseudoboehmite calculated on the basis of alumina.

In the catalytic cracking catalyst according to the present application, the clay may be selected from various clays suitable for use as a component in catalytic cracking catalysts, which are well known to those of ordinary skill in the art. For example, the clay may be one or more selected from kaolin, hydrated halloysite, montmorillonite, diatomite, halloysite, saponite, rector, sepiolite, attapulgite, hydrotalcite, and bentonite. Preferably, the clay is present in the catalytic cracking catalyst according to the present application in an amount, on a dry basis, of about 20-55 wt % or about 30-50 wt %.

In a preferred embodiment, the catalytic cracking catalyst according to the present application comprises about 25-40 wt %, on a dry basis, of the modified Y-type molecular sieve, about 20-35 wt % of an alumina binder calculated on the basis of alumina, and about 30-50 wt %, on a dry basis, of a clay.

First Embodiment of the Catalytic Cracking Catalyst According to the Present Application In a first embodiment of the catalytic cracking catalyst according to the present application, the modifying metal in the modified molecular sieve is magnesium, the modified molecular sieve has a magnesium content of about 0.5-4.5 wt % calculated on the basis of magnesium oxide, a sodium content of no more than about 0.5 wt % calculated on the basis of sodium oxide, a total pore volume of about 0.33-0.39 ml/g, a proportion of the pore volume of secondary pores having a pore size of 2-100 nm to the total pore volume of about 10-25%, a lattice constant of about 2.440-2.455 nm, a framework silica-alumina ratio ($SiO_2/Al_2O_3$ molar ratio) of about 7.3-14.0, a proportion of non-framework aluminum content to the total aluminum content of no more than about 20%, a lattice collapse temperature of not lower than about 1040° C., and a ratio of B acid to L acid in the total acid content of no less than about 2.30, as determined by pyridine adsorption infrared spectroscopy at 200° C.

Preferably, the modified Y-type molecular sieve has a magnesium content of about 0.8-4.5 wt %, for example about 0.8-4.3 wt %, about 1-4.5 wt %, or about 1.2-4.3 wt %, calculated on the basis of magnesium oxide.

Preferably, the modified Y-type molecular sieve has a sodium content of about 0.1-0.5 wt %, for example about 0.15-0.5 wt %, about 0.2-0.48 wt %, about 0.30-0.5 wt %, or about 0.35-0.48 wt %, calculated on the basis of sodium oxide.

Preferably, the modified Y-type molecular sieve has a total pore volume of about 0.35-0.39 ml/g, for example about 0.355-0.375 ml/g.

Preferably, the modified Y-type molecular sieve has a proportion of the pore volume of secondary pores having a pore size of 2-100 nm to the total pore volume of about 15-21%, preferably about 17-21%.

Preferably, the modified Y-type molecular sieve has a framework silica-alumina ratio ($SiO_2/Al_2O_3$ molar ratio) of about 8.4-12.6.

Preferably, the modified Y-type molecular sieve has a proportion of non-framework aluminum content to the total aluminum content of about 13-19%.

Preferably, the modified Y-type molecular sieve has a lattice collapse temperature of about 1040-1080° C., for example about 1045-1080° C., about 1047-1058° C., about 1057-1075° C., about 1047-1065° C. or about 1045-1060° C.

Preferably, the modified Y-type molecular sieve has a ratio of B acid to L acid in the total acid content of about 2.3-5.0, preferably about 2.4-4.2, for example about 2.4-3.5, as determined by pyridine adsorption infrared spectroscopy at 200° C.

Preferably, the modified Y-type molecular sieve has a lattice constant of about 2.442-2.452 nm.

Preferably, the modified Y-type molecular sieve has a crystalline retention of greater than about 33%, for example about 33-48%, about 33-45%, about 36-40%, or about 39-45%, after aging at 800° C. under atmospheric pressure in a 100 vol % steam atmosphere for 17 hours.

Preferably, the modified Y-type molecular sieve has a relative crystallinity of no less than about 58%, for example about 58-70%, about 59-68%, or about 59-64%.

Preferably, the modified Y-type molecular sieve has a specific surface area of about 620-670 m²/g, for example about 630-660 m²/g.

Preferably, the modified Y-type molecular sieve has a micropore volume of about 0.25-0.35 ml/g, for example about 0.26-0.32 ml/g.

Preferably, the modified Y-type molecular sieve has no absorption peak at a wavelength of 285-295 nm in its UV-Vis absorption spectrum.

Preferably, the modified Y-type molecular sieve has an O1s electron binding energy of no greater than about 532.55 eV, for example, about 532.39-532.52 eV.

Second Embodiment of the Catalytic Cracking Catalyst According to the Present Application In a second embodiment of the catalytic cracking catalyst according to the present application, the modifying metal in the modified molecular sieve is calcium, the modified Y-type molecular sieve has a calcium content of about 0.7-6.3 wt % calculated on the basis of calcium oxide, a sodium content of no more than about 0.5 wt % calculated on the basis of sodium oxide, a total pore volume of about 0.33-0.39 ml/g, a proportion of the pore volume of secondary pores having a pore size of 2-100 nm to the total pore volume of about 10-25%, a lattice constant of about 2.440-2.455 nm, a framework silica-alumina ratio ($SiO_2/Al_2O_3$ molar ratio) of about 7.3-14.0, a proportion of non-framework aluminum content to the total aluminum content of no more than about 20%, a lattice collapse temperature of not lower than about 1040° C., and a ratio of B acid to L acid in the total acid content of no less than about 2.30, as determined by pyridine adsorption infrared spectroscopy at 200° C.

Preferably, the modified Y-type molecular sieve has a calcium content of about 0.9-5.9 wt %, for example about 1.5-6.0 wt % or about 0.7-4.3 wt %, calculated on the basis of calcium oxide.

Preferably, the modified Y-type molecular sieve has a sodium content of about 0.1-0.5 wt %, for example about 0.15-0.5 wt %, about 0.20-0.5 wt %, or about 0.3-0.46 wt %, calculated on the basis of sodium oxide.

Preferably, the modified Y-type molecular sieve has a total pore volume of about 0.35-0.39 ml/g, for example about 0.35-0.375 ml/g.

Preferably, the modified Y-type molecular sieve has a proportion of the pore volume of secondary pores having a pore size of 2.0-100 nm to the total pore volume of about 15-21%, for example about 17-21%.

Preferably, the modified Y-type molecular sieve has a lattice collapse temperature of about 1040-1080° C. or about 1041-1055° C.

Preferably, the modified Y-type molecular sieve has a ratio of B acid to L acid in the total acid content of about 2.3-5.0, preferably about 2.4-4.2, for example about 2.4-3.5, as determined by pyridine adsorption infrared spectroscopy at 200° C.

Preferably, the modified Y-type molecular sieve has a lattice constant of about 2.442-2.452 nm.

Preferably, the modified Y-type molecular sieve has a framework silica-alumina ratio ($SiO_2/Al_2O_3$ molar ratio) of about 8.0-12.6 or about 8.1-12.

Preferably, the modified Y-type molecular sieve has a proportion of non-framework aluminum content to the total aluminum content of about 13-19 wt %.

Preferably, the modified Y-type molecular sieve has a crystalline retention of greater than about 33%, for example about 36-40%, about 39-45%, or about 35-45%, after aging at 800° C. under atmospheric pressure in a 100 vol % steam atmosphere for 17 hours.

Preferably, the modified Y-type molecular sieve has a relative crystallinity of no less than about 58%, for example about 58-75%, about 58-68%, about 59-70%, or about 59-63%.

Preferably, the modified Y-type molecular sieve has a specific surface area of about 620-670 m²/g, for example about 630-660 m²/g.

Preferably, the modified Y-type molecular sieve has a micropore volume of about 0.25-0.35 ml/g, for example about 0.26-0.32 ml/g.

In a fifth aspect, the present application provides a method for preparing a catalytic cracking catalyst, comprising the steps of: providing a modified Y-type molecular sieve according to the present application, forming a slurry comprising the modified Y-type molecular sieve, an alumina binder, clay, and water, and spray drying.

In a sixth aspect, the present application provides the use of a modified Y-type molecular sieve according to the present application in catalytic cracking of hydrocarbon oils, comprising contacting a hydrocarbon oil with a catalytic cracking catalyst comprising the modified Y-type molecular sieve of the present application.

In a seventh aspect, the present application provides a catalytic cracking process comprising the step of contacting a heavy oil feedstock with a catalytic cracking catalyst of the present application for reaction under conditions for fluidized catalytic cracking of heavy oils.

In the catalytic cracking process of the present application, the heavy oil can be any heavy hydrocarbon oil feedstock known in the art, such as one or more of vacuum gas oil, atmospheric residue, vacuum residue, and heavy deasphalted oil.

In the catalytic cracking process of the present application, the reaction conditions for fluidized catalytic cracking of heavy oils may be those commonly used in the art, for example, may include: a reaction temperature of about 480-530° C., a reaction time of about 1-10 seconds, and a catalyst-to-oil ratio by weight of about 3:1 to about 20:1.

The catalytic cracking process of the present application has high capacity of heavy oil conversion, and can provide a high yield of liquefied gas, light oil, total liquid and gasoline, a high content of dimethyl-branched hydrocarbons, a high ratio of the content of dimethyl-branched hydrocarbons to the content of monomethyl-branched hydrocarbons in the resulted gasoline and a high coke selectivity.

In some preferred embodiments, the present application provides the following technical solutions:

A1. A modified Y-type molecular sieve, having a modifying metal content of about 0.5-6.3 wt % calculated on the basis of an oxide of the modifying metal, and a sodium content of no more than about 0.5 wt %, preferably about 0.1-0.5 wt %, calculated on the basis of sodium oxide, on a dry basis and based on the weight of said modified Y-type molecular sieve, said modifying metal being magnesium and/or calcium; a proportion of non-framework aluminum content to the total aluminum content of no more than about 20%, a total pore volume of about 0.33-0.39 ml/g, a proportion of the pore volume of secondary pores having a pore size of 2-100 nm to the total pore volume of about 10-25%, a lattice constant of about 2.440-2.455 nm, a lattice collapse temperature of not lower than about 1040° C., and a ratio of B acid to L acid in the total acid content of no less than about 2.30, as determined by pyridine adsorption infrared spectroscopy at 200° C., preferably the modified Y-type molecular sieve has no absorption peak at a wavelength of 285-295 nm in its UV-Vis absorption spectrum.

A2. The modified Y-type molecular sieve according to Item A1, having a proportion of the pore volume of secondary pores having a pore size of 2-100 nm to the total pore volume of about 15-21%, preferably about 17-21%.

A3. The modified Y molecular sieve according to Item A1 or A2, having a proportion of non-framework aluminum content to the total aluminum content of about 13-19%, and a framework silica-alumina ratio of about 7.3-14 calculated as $SiO_2/Al_2O_3$ molar ratio.

A4. The modified Y-type molecular sieve according to any one of the preceding Items, having a lattice collapse temperature of about 1040-1080° C., for example about 1045-1080° C.

A5. The modified Y-type molecular sieve according to any one of the preceding Items, having a ratio of B acid to L acid in the total acid content of about 2.3-5.0, preferably about 2.4-4.2, as determined by pyridine adsorption infrared spectroscopy at 200° C.

A6. The modified Y-type molecular sieve according to any one of the preceding Items, wherein the modified Y-type molecular sieve has a relative crystalline retention of about 33% or more, for example about 33-45%, after aging at 800° C. under atmospheric pressure in a 100% steam atmosphere for 17 hours.

A7. The modified Y-type molecular sieve according to any one of the preceding Items, having a relative crystallinity of about 58-75%, for example about 58-70%.

A8. The modified Y-type molecular sieve according to any one of the preceding Items, wherein the modifying metal is magnesium, and the modified Y-type molecular sieve has a magnesium content of about 0.5-4.5 wt %, for example about 0.6-4.3 wt %, calculated on the basis of magnesium oxide, a sodium content of about 0.2-0.5 wt %, calculated on the basis of sodium oxide, a lattice constant of about 2.442-2.452 nm, and a framework silica-alumina ratio, calculated as $SiO_2/Al_2O_3$ molar ratio, of about 8.4-12.6; or the modifying metal is calcium, and the modified Y-type molecular sieve has a calcium content of about 0.7-6.3 wt %, preferably about 0.9-5.9 wt %, for example about 1.5-6 wt %, calculated on the basis of calcium oxide, a sodium content of no more than about 0.5 wt %, preferably about 0.2-0.5 wt %, calculated on the basis of sodium oxide, a lattice constant of about 2.442-2.452 nm, and a framework silica-alumina ratio, calculated as $SiO_2/Al_2O_3$ molar ratio, of about 8.0-12.6.

A9. The modified Y-type molecular sieve according to any one of the preceding Items, wherein the modified Y-type molecular sieve has an O1s electron binding energy of no greater than about 532.55 eV, for example about 532.39-532.52 eV.

A10. A method for preparing a modified Y-type molecular sieve, comprising the steps of:

(1) contacting a NaY molecular sieve with a solution of a soluble magnesium salt and/or soluble calcium salt for ion exchange reaction to obtain a Y-type molecular sieve comprising magnesium and/or calcium with reduced sodium content;

(2) subjecting the Y-type molecular sieve obtained in the step (1) to roasting at a temperature of about 350-480° C. in an atmosphere of about 30-90 vol % of steam for about 4.5-7 hours, and optionally drying, to obtain a Y-type molecular sieve with reduced lattice constant; and (3) contacting the Y-type molecular sieve obtained in the step (2) with gaseous silicon tetrachloride for reaction at a weight ratio of $SiCl_4$ to the Y-type molecular sieve with reduced lattice constant, on a dry basis, of about 0.1:1 to about 0.7:1, and a reaction temperature of about 200-650° C. for a reaction time of about 10 minutes to about 5 hours, to obtain the modified Y-type molecular sieve.

A11. The method according to Item A10, wherein the Y-type molecular sieve obtained in step (1) has a lattice constant of about 2.465-2.472 nm and a sodium content of no more than about 8.8 wt % calculated on the basis of sodium oxide.

A12. The method according to Items A10 or A11, wherein the Y-type molecular sieve obtained in step (1) has a magnesium content, calculated on the basis of MgO, of about 0.5-7.0 wt %, a sodium content, calculated on the basis of sodium oxide, of about 4-8.8 wt %, for example about 5.5-8.5 wt %, and a lattice constant of about 2.465-2.472 nm; or the Y-type molecular sieve obtained in step (1) has a calcium content, calculated on the basis of CaO, of about 0.8-10 wt %, a sodium content of about 4-8.8 wt %, for example about 5-7.5 wt %, calculated on the basis of sodium oxide, and a lattice constant of about 2.465-2.472 nm.

A13. The method according to any one of Items A10-A12, wherein in step (1), the NaY molecular sieve, the soluble magnesium salt and/or calcium salt and water are mixed at a weight ratio of the NaY molecular sieve:the soluble magnesium salt and/or calcium salt:$H_2O$ of about 1:0.005-0.28:5-15 for ion exchange.

A14. The method according to any one of Items A11-A13, wherein in step (1), the NaY molecular sieve is mixed with water, and a soluble magnesium salt, a soluble calcium salt, a solution of a soluble calcium salt, and/or a solution of a soluble magnesium salt is added under stirring to conduct an ion exchange reaction;

the conditions for the ion exchange reaction include: an exchange temperature of about 15-95° C. and an exchange time of about 30-120 minutes;

preferably, the soluble magnesium salt is magnesium chloride and/or magnesium nitrate, and/or preferably, the soluble calcium salt is calcium chloride and/or calcium nitrate.

A15. The method according to any one of Items A10-A14, wherein in step (2), the roasting temperature is about 380-470° C., the roasting atmosphere is an atmosphere of about 40-80% steam, and the roasting time is about 5-6 hours.

A16. The method according to any one of Items A10-A15, wherein the Y-type molecular sieve with reduced lattice constant obtained in step (2) has a lattice constant of about 2.450-2.462 nm and a water content of no more than about 1 wt %.

A17. The method according to any one of Items A10-A16, wherein the step (3) further comprises washing the resulted modified Y-type molecular sieve with water under washing conditions that include: molecular sieve:$H_2O$ ratio of about 1:5-20, a pH of about 2.5-5.0, and a washing temperature of about 30-60° C.

A18. A modified Y-type molecular sieve obtained by the method according to any one of Items A10-A17.

A19. A catalytic cracking catalyst comprising about 10-50 wt %, on a dry basis, of a modified Y-type molecular sieve, about 10-40 wt %, calculated on the basis of alumina, of an alumina binder and about 10-80 wt %, on a dry basis, of a clay; wherein the modified Y-type molecular sieve is a modified Y-type molecular sieve according to any one of Items A1-A9 and A18.

17

A20. Use of a modified Y-type molecular sieve according to any one of Items A1-A9 and A18 in the catalytic cracking of hydrocarbon oils, comprising a step of contacting a hydrocarbon oil with a catalytic cracking catalyst comprising a modified Y-type molecular sieve according to any one of Items A1-A9 and A18.

B1. A modified Y-type molecular sieve, having a magnesium oxide content of about 0.5-4.5 wt %, a sodium oxide content of about 0.1-0.5 wt %, a total pore volume of 0.33-0.39 ml/g, a proportion of the pore volume of secondary pores having a pore size of 2-100 nm to the total pore volume of about 10-25%, a lattice constant of about 2.440-2.455 nm, a proportion of non-framework aluminum content to the total aluminum content of no more than about 20%, a lattice collapse temperature of not lower than about 1040° C., and a ratio of B acid to L acid in the total acid content of no less than about 2.30, as determined by pyridine adsorption infrared spectroscopy at 200° C.; wherein the molecular sieve has no absorption peak at the wavelength of 285-295 nm in its UV-Vis absorption spectrum obtained via UV-Vis analysis.

B2. The modified Y-type molecular sieve according to Item B1, wherein the modified Y-type molecular sieve has a proportion of the pore volume of secondary pores having a pore size of 2-100 nm to the total pore volume of about 15-21%.

B3. The modified Y molecular sieve according to Item B1, wherein the modified Y molecular sieve has a proportion of non-framework aluminum content to the total aluminum content of about 13-19%, and a framework silica-alumina ratio of about 7.3-14 calculated as $SiO_2/Al_2O_3$ molar ratio.

B4. The modified Y-type molecular sieve according to Item B1, wherein the modified Y-type molecular sieve has a lattice collapse temperature of about 1045-1080° C.

B5. The modified Y molecular sieve according to Item B1, wherein the modified Y molecular sieve has a ratio of B acid to L acid in the total acid content of about 2.4-4.2, as determined by pyridine adsorption infrared spectroscopy at 200° C.

B6. The modified Y-type molecular sieve according to Item B1, wherein the modified Y-type molecular sieve has a relative crystallinity retention of about 33% or more, for example, about 33-45%, after aging at 800° C. under atmospheric pressure in a 100% steam atmosphere for 17 hours.

B7. The modified Y-type molecular sieve according to Item B1, wherein the modified Y-type molecular sieve has a relative crystallinity of about 58-70%.

B8. The modified Y-type molecular sieve according to any one of Items B1-B7, wherein the modified Y-type molecular sieve has a magnesium oxide content of about 0.6-4.3 wt %, a sodium oxide content of about 0.2-0.5 wt %, a lattice constant of about 2.442-2.450 nm, and a framework silica-alumina ratio of about 8.4-12.6.

B9. A method for preparing a modified Y-type molecular sieve, comprising the steps of:

(1) contacting a NaY molecular sieve with a solution of a soluble magnesium salt for ion exchange reaction, filtering, washing, and optionally drying, to obtain a magnesium-containing Y-type molecular sieve having a normal lattice constant and reduced sodium oxide content;

(2) subjecting the above magnesium-containing Y-type molecular sieve having a normal lattice constant and reduced sodium oxide content to roasting at a temperature of about 350-480° C. in an atmosphere of about 30-90 vol % of steam for about 4.5-7 hours, optionally drying, to obtain a Y-type molecular sieve with reduced lattice constant; and (3) contacting the Y-type molecular sieve with reduced lattice constant with gaseous silicon tetrachloride for reaction at a weight ratio of $SiCl_4$ to the Y-type molecular sieve with reduced lattice constant, on a dry basis, of about 0.1:1 to about 0.7:1, and a reaction temperature of about 200-650° C. for a reaction time of about 10 minutes to about 5 hours, washing and filtering, to obtain the modified Y-type molecular sieve.

B10. The method according to Item B9, wherein the magnesium-containing Y-type molecular sieve having a normal lattice constant and reduced sodium oxide content obtained in step (1) has a lattice constant of about 2.465-2.472 nm and a sodium oxide content of no more than 8.8 wt %.

B11. The method according to Item B9, wherein in step (1), the magnesium-containing Y-type molecular sieve having a normal lattice constant and reduced sodium oxide content has a magnesium content of about 0.6-5.5 wt % calculated on the basis of MgO, a sodium oxide content of about 4-8.8 wt %, for example about 5.5-8.5 wt %, and a lattice constant of about 2.465-2.472 nm.

B12. The method according to Item B9, wherein the step (1) of contacting a NaY molecular sieve with a solution of a soluble magnesium salt for ion exchange reaction is carried out by mixing a NaY molecular sieve, a soluble magnesium salt and water at a weight ratio of the NaY molecular sieve:the soluble magnesium salt:$H_2O$ of about 1:0.005-0.19:5-15, and stirring.

B13. The method according to Item B10 or B12, wherein the step (1) of contacting a NaY molecular sieve with a solution of a soluble magnesium salts for ion exchange reaction comprises: mixing a NaY molecular sieve with water, adding a magnesium salt and/or magnesium salt solution under stirring for ion exchange reaction, filtering and washing; the conditions for the ion exchange reaction include: an exchange temperature of about 15-95° C., and an exchange time of about 30-120 minutes, wherein the solution of soluble magnesium salt is an aqueous solution of the soluble magnesium salt; and the soluble magnesium salt is preferably magnesium chloride and/or magnesium nitrate.

B14. The method according to Item B9, wherein in step (2), the roasting temperature is about 380-460° C., the roasting atmosphere is an atmosphere of about 40-80% steam, and the roasting time is about 5-6 hours.

B15. The method according to Item B9, wherein the Y-type molecular sieve with reduced lattice constant obtained in step (2) has a lattice constant of about 2.450-2.462 nm, and a water content of no more than about 1 wt %.

B16. The method according to Item B9, wherein the washing of step (3) is carried out by washing with water under conditions including a ratio of molecular sieve:$H_2O$ of about 1: 6-15, a pH of about 2.5-5.0, and a washing temperature of about 30-60° C.

C1. A catalytic cracking catalyst comprising 10-50 wt %, on a dry basis, of a modified Y-type molecular sieve, 10-40 wt % of an alumina binder calculated on the basis of alumina, and 10-80 wt %, on a dry basis, of a clay; wherein the modified Y-type molecular sieve has a magnesium oxide content of about 0.5-4.5 wt %, a sodium oxide content of about 0.1-0.5 wt %, a total pore volume of 0.33-0.39 ml/g, a proportion of the pore volume of secondary pores having a pore size of 2-100 nm to the total pore volume of about 10-25%, a lattice constant of about 2.440-2.455 nm, a proportion of non-framework aluminum content to the total aluminum content of no more than about 20%, a lattice collapse temperature of not lower than about 1040° C., and a ratio of B acid to L acid in the total acid content of no less than about 2.30, as determined by pyridine adsorption infrared spectroscopy at 200° C.; wherein the molecular sieve has no absorption peak at the wavelength of 285-295 nm in its UV-Vis absorption spectrum obtained via UV-Vis analysis.

C2. The catalytic cracking catalyst according to Item C1, wherein the modified Y-type molecular sieve has a proportion of the pore volume of secondary pores having a pore size of 2-100 nm to the total pore volume of about 15-21%, a proportion of non-framework aluminum content to the total aluminum content of about 13-19%, a framework silica-alumina ratio of about 7.3-14 calculated as $SiO_2$/$Al_2O_3$ molar ratio, a lattice collapse temperature of 1045-1080° C., and a ratio of B acid to L acid in the total acid content of about 2.4-4.2, as determined by pyridine adsorption infrared spectroscopy at 200° C.

C3. The catalytic cracking catalyst according to Item C1, wherein the modified Y-type molecular sieve has a relative crystallinity retention of about 33% or more, for example, about 33-45%, after severe aging at 800° C. under atmospheric pressure in a 100% steam atmosphere for 17 hours.

C4. The catalytic cracking catalyst according to Item C1, wherein the modified Y-type molecular sieve has a relative crystallinity of about 58-70%.

C5. The catalytic cracking catalyst according to any one of Items C1-C4, wherein the modified Y-type molecular sieve has a magnesium oxide content of about 0.6-4.3 wt %, a sodium oxide content of about 0.2-0.5 wt %, a lattice constant of about 2.442-2.450 nm, and a framework silica-alumina ratio of about 8.4-12.6.

C6. A method for preparing a catalytic cracking catalyst, comprising the steps of preparing a modified Y-type molecular sieve, forming a slurry comprising the modified Y-type molecular sieve, an alumina binder, a clay and water, and spray drying, wherein the modified Y-type molecular sieve is prepared by a method comprising the steps of:

(1) contacting a NaY molecular sieve with a solution of a soluble magnesium salt for ion exchange reaction, filtering, washing, and optionally drying, to obtain a magnesium-containing Y-type molecular sieve having a normal lattice constant and reduced sodium oxide content;

(2) subjecting the above magnesium-containing Y-type molecular sieve having a normal lattice constant and reduced sodium oxide content to roasting at a temperature of about 350-480° C. in an atmosphere of about 30-90 vol % of steam for about 4.5-7 hours, optionally drying, to obtain a Y-type molecular sieve with reduced lattice constant;

(3) contacting the Y-type molecular sieve with reduced lattice constant with gaseous silicon tetrachloride for reaction at a weight ratio of $SiCl_4$ to the Y-type molecular sieve with reduced lattice constant, on a dry basis, of about 0.1:1 to about 0.7:1, and a reaction temperature of about 200-650° C. for a reaction time of about 10 minutes to about 5 hours, washing and filtering, to obtain the modified Y-type molecular sieve.

C7. The method according to Item C6, wherein the magnesium-containing Y-type molecular sieve having a normal lattice constant and reduced sodium oxide content obtained in step (1) has a lattice constant of about 2.465-2.472 nm and a sodium oxide content of no more than 8.8 wt %; the Y-type molecular sieve with reduced lattice constant obtained in the step (2) has a lattice constant of about 2.450-2.462 nm, and a water content of no more than about 1 wt %.

C8. The method according to Item C7, wherein in step (1), the magnesium-containing Y-type molecular sieve having a normal lattice constant and reduced sodium oxide content has a magnesium content of about 0.6-5.5 wt %, calculated on the basis of MgO, and a sodium oxide content of about 4-8.8 wt %, for example about 5.5-8.5 wt %, and a lattice constant of about 2.465-2.472 nm.

C9. The method according to Item C6, wherein the step (1) of contacting a NaY molecular sieve with a solution of a soluble magnesium salts for ion exchange reaction is carried out by mixing a NaY molecular sieve, a soluble magnesium salt and water at a weight ratio of the NaY molecular sieve:the soluble magnesium salt:$H_2O$ of about 1:0.005-0.19:5-15, and stirring.

C10. The method according to Item C6 or C9, wherein the step (1) of contacting a NaY molecular sieve with a solution of a soluble magnesium salts for ion exchange reaction comprises: mixing a NaY molecular sieve with water, adding a soluble magnesium salt and/or a solution of a soluble magnesium salt under stirring to conduct an ion exchange reaction, filtering and washing; the conditions for the ion exchange reaction include: an exchange temperature of about 15-95° C. and an exchange time of about 30-120 minutes; wherein the soluble magnesium salt is preferably magnesium chloride and/or magnesium nitrate.

C11. The method according to Item C6, wherein in step (2), the roasting temperature is about 380-460° C., the roasting atmosphere is an atmosphere of about 40-80% steam, and the roasting time is about 5-6 hours.

C12. The method according to Item C6, wherein the washing of step (3) is carried out by washing with water under conditions including: a ratio of the molecular sieve:$H_2O$ of about 1: 6-15, a pH of about 2.5-5.0, and a washing temperature of about 30-60° C.

C13. A catalytic cracking method, comprising the step of contacting a heavy oil with a catalytic cracking catalyst under FCC conditions, wherein the catalytic cracking catalyst is a catalytic cracking catalyst according to any one of Items C1-05; and the FCC conditions include, for example: a reaction temperature of about 480-530° C., a reaction time of 1-10 seconds, a catalyst-to-oil ratio of 3-20:1 by weight.

D1. A modified Y-type molecular sieve, having a calcium oxide content of about 0.7-6.3 wt %, a sodium oxide content of about 0.1-0.5 wt %, a total pore volume of 0.33-0.39 ml/g, a proportion of the pore volume of secondary pores having a pore size of 2-100 nm to the total pore volume of about 10-25%, a lattice constant of about 2.440-2.455 nm, a proportion of non-framework aluminum content to the total aluminum content of no more than about 20%, a lattice collapse temperature of not lower than about 1040° C., and a ratio of B acid to L acid in the total acid content of no less than about 2.30, as determined by pyridine adsorption infrared spectroscopy at 200° C.

D2. The modified Y-type molecular sieve according to Item D1, wherein the modified Y-type molecular sieve has a proportion of the pore volume of secondary pores having a pore size of 2-100 nm to the total pore volume of about 15-21%.

D3. The modified Y-type molecular sieve according to Item D1, wherein the modified Y-type molecular sieve has a lattice collapse temperature of about 1040-1080° C., for example 1040-1055° C.

D4. The modified Y molecular sieve according to Item D1, having a ratio of B acid to L acid in the total acid content of about 2.4-4.2, as determined by pyridine adsorption infrared spectroscopy at 200° C.

D5. The modified Y molecular sieve according to Item D1, wherein the modified Y molecular sieve has a proportion of non-framework aluminum content to the total aluminum content of about 13-19%, and a framework silica-alumina ratio of about 7.3-14 calculated as $SiO_2/Al_2O_3$ molar ratio.

D6. The modified Y-type molecular sieve according to Item D1, wherein the modified Y-type molecular sieve has a relative crystallinity retention of about 33% or more, for example, about 35 to 45%, after aging at 800° C. under atmospheric pressure in a 100% steam atmosphere for 17 hours.

D7. The modified Y-type molecular sieve according to Item D1, wherein the modified Y-type molecular sieve has a relative crystallinity of about 58-75%.

D8. The modified Y molecular sieve according to any one of Items D1-D7, wherein the modified Y molecular sieve has a calcium oxide content of about 0.9-5.9 wt %, for example 1.5-6 wt %, a sodium oxide content of about 0.2-0.5 wt %, a lattice constant of about 2.442-2.452 nm, and a framework silica-alumina ratio of about 8.5-12.6.

D9. A method for preparing a modified Y-type molecular sieve, comprising the steps of:

(1) contacting a NaY molecular sieve with a solution of a soluble calcium salt for ion exchange reaction, filtering, washing, and optionally drying, to obtain a calcium-containing Y-type molecular sieve having a normal lattice constant and reduced sodium oxide content;

(2) subjecting the calcium-containing Y-type molecular sieve having a normal lattice constant and reduced sodium oxide content to roasting at a temperature of about 350-480° C. in an atmosphere of about 30-90 vol % of steam for about 4.5-7 hours, and optionally drying, to obtain a Y-type molecular sieve with reduced lattice constant;

(3) contacting the Y-type molecular sieve with reduced lattice constant with gaseous silicon tetrachloride for reaction at a weight ratio of $SiCl_4$ to the Y-type molecular sieve with reduced lattice constant, on a dry basis, of about 0.1:1 to about 0.7:1, and a reaction temperature of about 200-650° C. for a reaction time of about 10 minutes to about 5 hours, washing and filtering, to obtain the modified Y-type molecular sieve.

D10. The method according to Item D9, wherein the calcium-containing Y-type molecular sieve having a normal lattice constant and reduced sodium oxide content obtained in step (1) has a lattice constant of about 2.465-2.472 nm and a sodium oxide content of no more than 8.8 wt %.

D11. The method according to Item D9, wherein in step (1), the calcium-containing Y-type molecular sieve having a normal lattice constant and reduced sodium oxide content has a calcium content of about 0.8-10 wt % calculated on the basis of CaO, a sodium oxide content of about 4-8.8 wt %, for example about 5-7.5 wt %, and a lattice constant of about 2.465-2.472 nm.

D12. The method according to Item D9, wherein the step (1) of contacting a NaY molecular sieve with a solution of a soluble calcium salt for ion exchange is carried out by mixing a NaY molecular sieve, a soluble calcium salt and water at a weight ratio of the NaY molecular sieve:the soluble calcium salt:$H_2O$ of 1:0.009-0.28:5-15, and stirring, wherein the soluble calcium salt can be, for example, calcium chloride and/or calcium nitrate.

D13. The method according to Item D9 or D12, wherein the step (1) of contacting a NaY molecular sieve with a solution of a soluble calcium salt for ion exchange reaction comprises: mixing a NaY molecular sieve with water, adding a soluble calcium salt and/or a solution of a soluble calcium salt under stirring to conduct an ion exchange reaction, filtering and washing; the conditions for the ion exchange reaction include: an exchange temperature of about 15-95° C. and an exchange time of about 30-120 minutes.

D14. The method according to Item D9, wherein in step (2), the roasting temperature is about 380-460° C., the roasting atmosphere is an atmosphere of about 40-80% steam, and the roasting time is about 5-6 hours.

D15. The method according to Item D9, wherein the Y-type molecular sieve with reduced lattice constant obtained in step (2) has a lattice constant of about 2.450-2.462 nm, and a water content of no more than about 1 wt %.

D16. The method according to Item D9, wherein the washing of step (3) is carried out by washing with water under conditions including a ratio of molecular sieve:$H_2O$ of about 1: 6-15, a pH of about 2.5-5.0, and a washing temperature of about 30-60° C.

E1. A catalytic cracking catalyst comprising 10-50 wt %, on a dry basis, of a modified Y-type molecular sieve, 10-40 wt % of an alumina binder calculated on the basis of alumina, and 10-80 wt %, on a dry basis, of a clay; wherein the modified Y-type molecular sieve has a calcium oxide content of about 0.7-6.3 wt %, a sodium oxide content of about 0.1-0.5 wt %, a total pore volume of 0.33-0.39 ml/g, a proportion of the pore volume of secondary pores having a pore size of 2-100 nm to the total pore volume of about 10-25%, a lattice constant of about 2.440-2.455 nm, a proportion of non-framework aluminum content to the total aluminum content of no more than about 20%, a lattice collapse temperature of not lower than about 1040° C., and a ratio of B acid to L acid in the total acid content of no less than about 2.30, as determined by pyridine adsorption infrared spectroscopy at 200° C.

E2. The catalytic cracking catalyst according to Item E1, wherein the modified Y-type molecular sieve has a proportion of the pore volume of secondary pores having a pore size of 2-100 nm to the total pore volume of about 15-21%, a proportion of non-framework aluminum content to the total aluminum content of about 13-19%, a framework silica-alumina ratio of about 7.3-14 calculated as $SiO_2/Al_2O_3$ molar ratio, a lattice collapse temperature of 1040-1080° C., and a ratio of B acid to L acid in the total acid content of about 2.4-4.2, as determined by pyridine adsorption infrared spectroscopy at 200° C.

E3. The catalytic cracking catalyst according to Item E1 or E2, wherein the modified Y-type molecular sieve has a relative crystallinity retention of about 33% or more, for example, about 35-45%, after severe aging at 800° C. under atmospheric pressure in a 100% steam atmosphere for 17 hours.

E4. The catalytic cracking catalyst according to Item E1, E2 or E3, wherein the modified Y-type molecular sieve has a relative crystallinity of about 58-75%.

E5. The catalytic cracking catalyst according to any one of Items E1-E4, wherein the modified Y-type molecular sieve has a calcium oxide content of about 0.9-5.9 wt %, a sodium oxide content of about 0.2-0.5 wt %, a lattice constant of about 2.442-2.450 nm, and a framework silica-alumina ratio of about 8.5-12.6.

E6. A method for preparing a catalytic cracking catalyst, comprising the steps of preparing a modified Y-type molecular sieve, forming a slurry comprising the modified Y-type molecular sieve, an alumina binder, a clay and water, and spray drying, wherein the modified Y-type molecular sieve is prepared by a method comprising the steps of:

(1) contacting a NaY molecular sieve with a solution of a soluble calcium salt for ion exchange reaction, filtering, washing, and optionally drying, to obtain a calcium-containing Y-type molecular sieve having a normal lattice constant and reduced sodium oxide content;

(2) subjecting the calcium-containing Y-type molecular sieve having a normal lattice constant and reduced sodium oxide content to roasting at a temperature of about 350-480° C. in an atmosphere of about 30-90 vol % of steam for about 4.5-7 hours, and optionally drying, to obtain a Y-type molecular sieve with reduced lattice constant;

(3) contacting the Y-type molecular sieve with reduced lattice constant with gaseous silicon tetrachloride for reaction at a weight ratio of $SiCl_4$ to the Y-type molecular sieve with reduced lattice constant, on a dry basis, of about 0.1:1 to about 0.7:1, and a reaction temperature of about 200-650° C. for a reaction time of about 10 minutes to about 5 hours, washing and filtering, to obtain the modified Y-type molecular sieve.

E7. The method according to Item E6, wherein the calcium-containing Y-type molecular sieve having a normal lattice constant and reduced sodium oxide content obtained in step (1) has a lattice constant of about 2.465-2.472 nm and a sodium oxide content of no more than 8.8 wt %; the Y-type molecular sieve with reduced lattice constant obtained in the step (2) has a lattice constant of about 2.450-2.462 nm, and a water content of no more than about 1 wt %.

E8. The method according to Item E7, wherein in step (1), the calcium-containing Y-type molecular sieve having a normal lattice constant and reduced sodium oxide content has a calcium content of about 0.8-10 wt % calculated on the basis of CaO, a sodium oxide content of about 4-8.8 wt %, for example about 5-7.5 wt %, and a lattice constant of about 2.465-2.472 nm.

E9. The method according to Item E6, wherein the step (1) of contacting a NaY molecular sieve with a solution of a soluble calcium salt for ion exchange reaction is carried out by mixing a NaY molecular sieve, a soluble calcium salt and water at a weight ratio of the NaY molecular sieve:the soluble calcium salt:$H_2O$ of 1:0.009-0.28:5-15, and stirring.

E10. The method according to Item E6 or E9, wherein the step (1) of contacting a NaY molecular sieve with a solution of a soluble calcium salt for ion exchange reaction comprises: mixing a NaY molecular sieve with water, adding a soluble calcium salt and/or a solution of a soluble calcium salt under stirring to conduct an ion exchange reaction, filtering and washing; the conditions for the ion exchange reaction include: an exchange temperature of about 15-95° C. and an exchange time of about 30-120 minutes; wherein the soluble calcium salt is preferably calcium chloride and/or calcium nitrate.

E11. The method according to Item E6, wherein in step (2), the roasting temperature is about 380-460° C., the roasting atmosphere is an atmosphere of about 40-80% steam, and the roasting time is about 5-6 hours.

E12. The method according to Item E6, wherein the washing of step (3) is carried out by washing with water under conditions including a ratio of molecular sieve:$H_2O$ of about 1:6-15, a pH of about 2.5-5.0, and a washing temperature of about 30-60° C.

E13. A catalytic cracking method, comprising the step of contacting a heavy oil with a catalytic cracking catalyst under FCC conditions, wherein the catalytic cracking catalyst is a catalytic cracking catalyst according to any one of Items E1-E5; the FCC conditions include, for example, a reaction temperature of about 480-530° C., a reaction time of 1-10 seconds, and a catalyst-to-oil ratio of 3-20:1 by weight.

EXAMPLES

The present application will be further illustrated by the following examples, without however limiting the present application.

Feedstocks:

In the following examples and comparative examples, NaY molecular sieves are supplied by Qilu Branch of Sinopec Catalyst Co., Ltd., of which the sodium content is 13.5% by weight calculated on the basis of sodium oxide, the framework silica-alumina ratio ($SiO_2/Al_2O_3$ molar ratio) is 4.6, the lattice constant is 2.470 nm, and the relative crystallinity is 90%; magnesium chloride and magnesium nitrate are chemically pure reagents produced by Sinopharm Chemical Reagent Co., Ltd. (Hushi); calcium chloride and calcium nitrate are chemically pure reagents produced by Sinopharm Chemical Reagent Co., Ltd. (Hushi); pseudo-boehmite is an industrial product produced by Shandong Aluminum Plant with a solid content of 61% by weight; kaolin is a specialized kaolin for cracking catalysts produced by China Kaolin Clay Co., Ltd. of Suzhou with a solid content of 76% by weight; aluminum sol is supplied by Qilu Branch of Sinopec Catalyst Co., Ltd. having an alumina content of 21% by weight.

Unless otherwise stated, the reagents used in each of the comparative examples and examples were chemically pure reagents.

Analytical Method:

In each of the comparative examples and examples, the element content of the molecular sieve was determined by X-ray fluorescence spectrometry; the lattice constant and relative crystallinity of the molecular sieve were determined by X-ray powder diffraction (XRD) according to the RIPP 145-90, RIPP 146-90 standard method (see "Petrochemical Analysis Methods (RIPP Test Methods)", edited by Cuiding YANG et al., Science Press, September 1990, First Edition, pp. 412-415), the framework silica-alumina ratio of the molecular sieve was calculated according to the following equation:

$$SiO_2/Al_2O_3=(2.5858-a_0)\times 2/(a_0-2.4191)$$

wherein $a_0$ refers to the lattice constant, of which the unit is nm.

The total silica-alumina ratio of the molecular sieve was calculated based on the content of Si and Al elements determined by X-ray fluorescence spectrometry. The proportion of framework Al content to the total Al content was calculated based on the framework silica-alumina ratio determined by XRD and the total silica-alumina ratio determined by XRF, and then the proportion of non-framework Al content to the total Al content was calculated. The lattice collapse temperature was determined by differential thermal analysis (DTA).

In each of the comparative examples and examples, the acid center type of the molecular sieve and the acid content thereof were determined by pyridine adsorption infrared spectroscopy. The instrument was IFS113V type FT-IR (Fourier transform infrared) spectrometer of Bruker Company, USA. The method for determining the acid content by pyridine adsorption infrared spectroscopy at 200° C. was as follows: a self-supported sample tablet was placed in an in-situ cell of an infrared spectrometer and sealed; the sample was heated to a temperature of 400° C., vacuumed to $10^{-3}$ Pa, and maintained at the temperature for 2 h to remove the gas molecules adsorbed by the sample; the sample was cooled to room temperature, a pyridine vapor at a pressure of 2.67 Pa was introduced, and the sample was maintained under such conditions for 30 min to achieve an adsorption equilibrium; then the sample was heated to a temperature of 200° C., and vacuumed to $10^{-3}$ Pa for desorption for 30 min; after that, the sample was cooled to room temperature and subjected to spectrographic analysis at a scanning wave number range of 1400 cm$^{-1}$ to 1700 cm$^{-1}$, and the pyridine adsorption infrared spectrum of the sample desorbed at 200° C. was obtained. The relative amount of the total Brönsted acid center (B acid center) and the Lewis acid center (L acid center) in the molecular sieve was obtained based on the intensity of the characteristic adsorption peaks at 1540 cm$^{-1}$ and 1450 cm$^{-1}$ in the pyridine adsorption infrared spectrum.

The UV-Vis absorption spectrum analysis was performed using an Agilent Cary300 multifunctional ultraviolet-visible spectrophotometer (with a diffuse reflection integrating sphere device). The instrument specification is as follows: the wavelength range is 190-1100 nm, the wavelength precision is +/−0.1 nm, the wavelength reproducibility is +/−0.1 nm, the baseline stability is 0.0003/h, the stray light is less than 0.02 percent, the photometer precision is +/−0.003, and the wavelength interval is 3 nm.

In each of the comparative examples and examples, the pore volume of secondary pores was determined as follows: according to the RIPP 151-90 standard method (see "Petrochemical Analysis Methods (RIPP Test Methods)", Cuiding YANG et al., Science Press, September 1990, First Edition, pp. 424-426), the total pore volume of the molecular sieve was determined based on the adsorption isotherm, and then the micropore volume of the molecular sieve was determined based on the adsorption isotherm according to the T-plot method, and the pore volume of secondary pores was obtained by subtracting the micropore volume from the total pore volume.

In each of the comparative examples and examples, the 01 s electron binding energy of the molecular sieve was determined as follows: XPS test was performed on the ESCALab 250 X-ray photoelectron spectrometer of Thermo Fisher. The excitation source was monochromated Al Kα X-ray with an energy of 1486.6 eV and a power of 150 W. The penetration energy for narrow scans was 30 eV. The base vacuum at the time of analysis was about $6.5 \times 10^{-10}$ mbar. The binding energy was calibrated in accordance with the Cls peak (284.8 eV) of alkyl carbon or contaminated carbon. The processing software was Avantage 5.952 originally installed in the instrument. The binding energy value was determined based on the XPS data obtained.

Example 1

2000 g of NaY molecular sieve (on a dry basis) was added into 20 L of decationized water and mixed uniformly under stirring, 492 ml of Mg(NO$_3$)$_2$ solution (with a concentration of 248 g/L calculated on the basis of MgO) was added, and the mixture was stirred, heated to a temperature of 90-95° C. and kept for 1 hour. Then, the mixture was filtered and washed, and the filter cake was dried at 120° C., to obtain a Y-type molecular sieve having a lattice constant of 2.471 nm, a sodium content of 6.6 wt % calculated on the basis of sodium oxide and a magnesium content of 5.7 wt % calculated on the basis of MgO. Then, the resultant was roasted at 390° C. in an atmosphere comprising 50 vol % of steam and 50 vol % of air for 6 hours to obtain a Y-type molecular sieve having a lattice constant of 2.455 nm, and then dried to arrive at a water content of less than 1 wt %. After that, a gaseous SiCl$_4$ vaporized by heating was introduced at a weight ratio of SiCl$_4$:Y-type molecular sieve (on a dry basis) of 0.5:1, reacted at 400° C. for 2 hours, then washed with 20 L of decationized water, and filtered to obtain a modified Y-type molecular sieve of the present application, designated as SZ1, of which the physicochemical properties are shown in Table 1.

After SZ1 was aged in a bare state at 800° C. under atmospheric pressure in a 100% steam atmosphere for 17 hours (i.e. aged in a 100% steam atmosphere for 17 hours), the relative crystallinity of the molecular sieve SZ1 before and after aging was analyzed by XRD, and the relative crystallinity retention after aging was calculated. The results are shown in Table 2, in which:

$$\text{Relative crystallinity retention} = \frac{\text{Relative crystallinity of aged sample}}{\text{Relative crystallinity of fresh sample}} \times 100\%$$

714.5 g of an alumina sol having an alumina content of 21 wt % was added to 1565.5 g of decationized water, stirring was started, and 2763 g of kaolin having a solid content of 76 wt % was added and dispersed for 60 minutes. 2049 g of pseudo-boehmite having an alumina content of 61 wt % was added into 8146 g of decationized water, 210 ml of hydrochloric acid with a mass concentration of 36% was added under stirring, and the slurry of dispersed kaolin was added after 60 minutes of acidification. Then, 1500 g (on a dry basis) of ground SZ1 molecular sieve was added, uniformly mixed under stirring, then spray dried, washed, and dried to obtain a catalyst, designated as SC1. The resulted SC1 catalyst comprises, on a dry basis, 30 wt % of SZ1 molecular sieve, 42 wt % of kaolin, 25 wt % of pseudo-boehmite and 3 wt % of alumina sol.

Example 2

2000 g of NaY molecular sieve (on a dry basis) was added into 25 L of decationized water and mixed uniformly under stirring, 524 ml of MgCl$_2$ solution (with a concentration of 248 g/L calculated on the basis of MgO) was added, and the mixture was stirred, heated to a temperature of 90-95° C. and kept for 1 hour. Then, the mixture was filtered and washed, and the filter cake was dried at 120° C., to obtain a Y-type molecular sieve having a lattice constant of 2.471 nm, a sodium content of 5.2 wt % calculated on the basis of sodium oxide and a magnesium content of 6.2 wt % calculated on the basis of MgO. Then, the resultant was roasted at a temperature of 450° C. in an atmosphere of 80% steam for 5.5 hours to obtain a Y-type molecular sieve having a lattice constant of 2.461 nm, and then dried to arrive at a water content of less than 1 wt %. After that, a gaseous SiCl$_4$ vaporized by heating was introduced at a weight ratio of SiCl$_4$:Y-type molecular sieve of 0.6:1, reacted at 480° C. for 1.5 hours, then washed with 20 L of decationized water, and filtered to obtain a modified Y-type molecular sieve, designated as SZ2, of which the physicochemical properties are shown in Table 1.

After SZ2 was aged in a bare state at 800° C. under atmospheric pressure in a 100% steam atmosphere, the crystallinity of the molecular sieve SZ2 before and after aging was analyzed by XRD, and the relative crystallinity retention after aging was calculated. The results are shown in Table 2.

A microspherical catalyst, designated as SC2, was prepared as described in Example 1 by forming a slurry of the SZ2 molecular sieve, kaolin, water, a pseudo-boehmite binder, and alumina sol and spray drying, according to the conventional method for preparing catalytic cracking catalysts. The resulted SC2 catalyst comprises, on a dry basis, 30 wt % of SZ2 molecular sieve, 42 wt % of kaolin, 25 wt % of pseudo-boehmite and 3 wt % of alumina sol.

Example 3

2000 g of NaY molecular sieve (on a dry basis) was added into 22 L of decationized water and mixed uniformly under stirring, 306 ml of $MgCl_2$ solution (with a concentration of 248 g/L calculated on the basis of MgO) was added, and the mixture was stirred, heated to a temperature of 90-95° C., and kept for 1 hour under stirring. Then, the mixture was filtered and washed, and the filter cake was dried at 120° C., to obtain a Y-type molecular sieve having a lattice constant of 2.471 nm, a sodium content of 7.2 wt % calculated on the basis of sodium oxide and a magnesium content of 3.4 wt % calculated on the basis of MgO. Then, the resultant was roasted at 470° C. in an atmosphere of 70 vol % of steam for 5 hours to obtain a Y-type molecular sieve having a lattice constant of 2.458 nm, and then dried to arrive at a water content of less than 1 wt %. After that, a gaseous $SiCl_4$ vaporized by heating was introduced at a weight ratio of $SiCl_4$:Y-type molecular sieve of 0.4:1, reacted at 500° C. for 1 hours, then washed with 20 L of decationized water, and filtered to obtain a modified Y-type molecular sieve, designated as SZ3, of which the physicochemical properties are shown in Table 1.

After SZ3 was aged in a bare state at 800° C. under atmospheric pressure in a 100% steam atmosphere, the crystallinity of the molecular sieve SZ3 before and after aging was analyzed by XRD, and the relative crystallinity retention after aging was calculated. The results are shown in Table 2.

A microspherical catalyst, designated as SC3, was prepared by forming a slurry of the SZ3 molecular sieve, kaolin, water, a pseudo-boehmite binder, and alumina sol and spray drying, according to the conventional method for preparing catalytic cracking catalysts (as described in Example 1). The resulted SC3 catalyst comprises, on a dry basis, 30 wt % of SZ3 molecular sieve, 42 wt % of kaolin, 25 wt % of pseudo-boehmite and 3 wt % of alumina sol.

Example 4

A microspherical catalyst, designated as SC4, was prepared by forming a slurry of the SZ2 molecular sieve, kaolin, water, a pseudo-boehmite binder, and alumina sol and spray drying, according to the conventional method for preparing catalytic cracking catalysts (as described in Example 1). The resulted SC4 catalyst comprises, on a dry basis, 25 wt % of SZ2 molecular sieve, 47 wt % of kaolin, 24 wt % of pseudo-boehmite and 4 wt % of alumina sol.

Example 5

A microspherical catalyst, designated as SC5, was prepared by forming a slurry of the SZ2 molecular sieve, kaolin, water, a pseudo-boehmite binder, and alumina sol and spray drying, according to the conventional method for preparing catalytic cracking catalysts (as described in Example 1). The resulted SC5 catalyst comprises, on a dry basis, 40 wt % of SZ2 molecular sieve, 30 wt % of kaolin, 20 wt % of pseudo-boehmite and 10 wt % of alumina sol.

Comparative Example 1

2000 g of NaY molecular sieve (on a dry basis) was added into 20 L of decationized water, mixed uniformly under stirring, 1000 g of $(NH_4)_2SO_4$ was added, and the mixture was stirred, heated to a temperature of 90-95° C., and kept for 1 hour. Then, after filtering and washing, the filter cake was dried at 120° C., and then subjected to a hydrothermal treatment by roasting at 650° C. in a 100% steam atmosphere for 5 hours. Then, the resultant was added into 20 L of decationized water, uniformly mixed under stirring, 1000 g of $(NH_4)_2SO_4$ was added, and the mixture was stirred, heated to a temperature of 90-95° C., and kept for 1 hour. Then, after filtering and washing, the filter cake was dried at 120° C., and then subjected to a second hydrothermal treatment by roasting at 650° C. in a 100% steam atmosphere for 5 hours, to obtain a hydrothermally ultra-stabilized Y-type molecular sieve free of magnesium that has undergone two stages of ion-exchange and two stages of hydrothermal ultra-stabilization, designated as DZ1, of which the physicochemical properties are shown in Table 1.

After DZ1 was aged in a bare state at 800° C. under atmospheric pressure in a 100% steam atmosphere, the crystallinity of the molecular sieve DZ1 before and after aging was analyzed by XRD, and the relative crystallinity retention after aging was calculated. The results are shown in Table 2.

A microspherical catalyst, designated as DC1, was prepared by forming a slurry of the DZ1 molecular sieve, kaolin, water, a pseudo-boehmite binder, and alumina sol and spray drying, according to the conventional method for preparing catalytic cracking catalysts (as described in Example 1). The resulted DC1 catalyst comprises, on a dry basis, 30 wt % of DZ1 molecular sieve, 42 wt % of kaolin, 25 wt % of pseudo-boehmite and 3 wt % of alumina sol.

Comparative Example 2

2000 g of NaY molecular sieve (on a dry basis) was added into 20 L of decationized water, mixed uniformly under stirring, 1000 g of $(NH_4)_2SO_4$ was added, and the mixture was stirred, heated to a temperature of 90-95° C., and kept for 1 hour. Then, after filtering and washing, the filter cake was dried at 120° C., and then subjected to a hydrothermal treatment by roasting at 650° C. in a 100% steam atmosphere for 5 hours. Then, the resultant was added into 20 L of decationized water, uniformly mixed under stirring, 290 ml of $Mg(NO_3)_2$ solution (with a concentration of 248 g/L calculated on the basis of MgO) and 900 g $(NH_4)_2SO_4$ were added, and the mixture was stirred, heated to a temperature of 90-95° C., and kept for 1 hour. Then, after filtering and washing, the filter cake was dried at 120° C., and then subjected to a second hydrothermal treatment by roasting at 650° C. in a 100% steam atmosphere for 5 hours, to obtain a hydrothermally ultra-stabilized rare earth-containing Y-type molecular sieve that has undergone two stages of ion-exchange and two stages of hydrothermal ultra-stabilization, designated as DZ2, of which the physicochemical properties are shown in Table 1.

After DZ2 was aged in a bare state at 800° C. under atmospheric pressure in a 100% steam atmosphere, the crystallinity of the molecular sieve DZ2 before and after aging was analyzed by XRD, and the relative crystallinity retention after aging was calculated. The results are shown in Table 2.

A microspherical catalyst, designated as DC2, was prepared by forming a slurry of the DZ2 molecular sieve, kaolin, water, a pseudo-boehmite binder, and alumina sol and spray drying, according to the conventional method for preparing catalytic cracking catalysts (as described in Example 1). The resulted DC2 catalyst comprises, on a dry basis, 30 wt % of DZ2 molecular sieve, 42 wt % of kaolin, 25 wt % of pseudo-boehmite and 3 wt % of alumina sol.

Comparative Example 3

2000 g of NaY molecular sieve (on a dry basis) was added into 20 L of decationized water and mixed uniformly under stirring, 347 ml of $Mg(NO_3)_2$ solution (with a concentration of 248 g/L calculated on the basis of MgO) was added, and the mixture was stirred, heated to a temperature of 90-95° C. and kept for 1 hour. Then, the mixture was filtered, washed and dried to arrive at a water content of less than 1 wt %. Then, the resultant was subjected to a gas phase ultra-stabilization by introducing gaseous $SiCl_4$ vaporized by heating at a weight ratio of $SiCl_4$:Y-type molecular sieve of 0.4:1, and reacting at 580° C. for 1.5 hours. The resultant was washed with 20 L of decationized water, and filtered to obtain a gas phase ultra-stabilized high-silica Y-type molecular sieve, designated as DZ3, of which the physico-chemical properties are shown in Table 1.

After DZ3 was aged in a bare state at 800° C. under atmospheric pressure in a 100% steam atmosphere, the crystallinity of the molecular sieve DZ3 before and after aging was analyzed by XRD, and the relative crystallinity retention after aging was calculated. The results are shown in Table 2.

A microspherical catalyst, designated as DC3, was prepared by forming a slurry of the DZ3 molecular sieve, kaolin, water, a pseudo-boehmite binder, and alumina sol and spray drying, according to the conventional method for preparing catalytic cracking catalysts (as described in Example 1). The resulted DC3 catalyst comprises, on a dry basis, 30 wt % of DZ3 molecular sieve, 42 wt % of kaolin, 25 wt % of pseudo-boehmite and 3 wt % of alumina sol.

Reference Example 1

2000 g of NaY molecular sieve (on a dry basis) was added into 20 L of decationized water, mixed uniformly under stirring, 600 ml of $RE(NO_3)_3$ solution (with a concentration of 319 g/L calculated on the basis of $RE_2O_3$) was added, and the mixture was stirred, heated to a temperature of 90-95° C., and kept for 1 hour. Then, after filtering and washing, the filter cake was dried at 120° C., to obtain a Y-type molecular sieve having a lattice constant of 2.471 nm, a sodium content of 7.0 wt % calculated on the basis of sodium oxide and a rare earth content of 8.8 wt % calculated on the basis of $RE_2O$. Then, the resultant was roasted at 390° C. in an atmosphere comprising 50 vol % of steam and 50 vol % of air for 6 hours, to obtain a Y-type molecular sieve having a lattice constant of 2.455 nm, and then dried to arrive at a water content of less than 1 wt %. After that, a gaseous $SiCl_4$ vaporized by heating was introduced at a weight ratio of $SiCl_4$:Y-type molecular sieve (dry basis) of 0.5:1, reacted at 400° C. for 2 hours, then washed with 20 L of decationized water, and filtered. A sample of the filter cake of the molecular sieve was added to a solution comprising magnesium chloride, wherein the weight ratio of water to the molecular sieve was 2.5 and the weight ratio of magnesium (calculated on the basis of magnesium oxide) to the molecular sieve was 0.01. The mixture was stirred at 25° C. for 40 minutes, ammonia water was then added, and the pH was adjusted to 8.5. The resultant was uniformly mixed under stirring, filtered, and washed with deionized water. After that, the filter cake was dried and then roasting at 550° C. for 2 hours, to obtain a magnesium-containing modified Y-type molecular sieve, designated as SZB1, of which the physico-chemical properties are shown in Table 1.

A reference catalyst, designated as SCB1, was prepared using SZB1 following the procedure as described in Example 1 for preparing a catalyst.

TABLE 1

Properties of the molecular sieves obtained in the Examples and Comparative Examples

| Example No. | Ex. 1 | Ex. 2 | Ex. 3 | Comp. Ex. 1 | Comp. Ex. 2 | Comp. Ex. 3 | Ref. Ex. 1 |
|---|---|---|---|---|---|---|---|
| Sample Name | SZ1 | SZ2 | SZ3 | DZ1 | DZ2 | DZ3 | SZB1 |
| MgO content/wt % | 3.2 | 4.3 | 1.2 | 0 | 0.8 | 1.1 | 0.91 |
| $Na_2O$ content/wt % | 0.47 | 0.48 | 0.39 | 1.3 | 1.4 | 0.9 | 0.50 |
| Total $SiO_2/Al_2O_3$ molar ratio | 10.21 | 7.31 | 8.69 | 4.95 | 4.83 | 11.20 | 9.74 |
| Framework $SiO_2/Al_2O_3$ molar ratio | 12.56 | 8.45 | 10.39 | 10.39 | 7.83 | 11.95 | 11.95 |
| Framework aluminum/total aluminum × 100 | 81.3 | 86.5 | 83.6 | 47.59 | 61.6 | 93.7 | 81.5 |
| Non-framework aluminum/total aluminum × 100 | 18.7 | 13.5 | 16.4 | 52.41 | 38.4 | 6.3 | 18.5 |
| Lattice constant/nm | 2.442 | 2.451 | 2.446 | 2.446 | 2.453 | 2.443 | 2.443 |
| Relative crystallinity/% | 61.2 | 59.6 | 62.8 | 60.1 | 56.2 | 55.9 | 62.9 |
| Structure collapse temperature/° C. | 1051 | 1047 | 1058 | 1038 | 1015 | 1035 | 1068 |
| Specific surface area/(m²/g) | 632 | 651 | 638 | 615 | 594 | 639 | 632 |
| Total pore volume/(ml/g) | 0.355 | 0.372 | 0.365 | 0.349 | 0.323 | 0.331 | 0.351 |
| Micropore volume/(ml/g) | 0.280 | 0.303 | 0.293 | 0.255 | 0.248 | 0.313 | 0.277 |
| Pore volume of secondary pores/(ml/g) | 0.075 | 0.069 | 0.072 | 0.094 | 0.075 | 0.018 | 0.074 |
| Proportion of pore volume of secondary pores (2.0-100 nm) to the total pore volume/% | 20.84 | 17.93 | 19.72 | 26.93 | 22.62 | 5.16 | 21.08 |

TABLE 1-continued

Properties of the molecular sieves obtained in the Examples and Comparative Examples

| Example No. | Ex. 1 | Ex. 2 | Ex. 3 | Comp. Ex. 1 | Comp. Ex. 2 | Comp. Ex. 3 | Ref. Ex. 1 |
|---|---|---|---|---|---|---|---|
| B acid/L acid (total acid content ratio) | 2.45 | 3.45 | 3.01 | 0.75 | 2.10 | 3.65 | — |
| Peak at 285-290 nm in UV-Vis absorption spectrum | None | None | None | None | None | None | Yes |
| O1s Electron binding energy/eV | 532.48 | 532.43 | 532.51 | 532.76 | 532.70 | 532.75 | 532.81 |

It can be seen from Table 1, the highly stable modified Y-type molecular sieve of the present application has the following advantages: a low sodium content, a relatively lower non-framework aluminum content at a relatively higher silica-alumina ratio, a relatively higher proportion of the pore volume of secondary pores having a pore size of 2.0-100 nm to the total pore volume, a relatively higher B acid/L acid ratio (the ratio of total B acid content to total L acid content), a relatively higher crystallinity determined when the molecular sieve has a relatively smaller lattice constant and a certain magnesium content, and a high thermal stability.

TABLE 2

Hydrothermal stability of molecular sieves obtained in the Examples and Comparative Examples

| Example No. | Sample Name | Relative crystallinity of fresh molecular sieve sample (%) | Relative crystallinity of aged molecular sieve sample (%) (800° C./aged for 17 hours) | Relative crystallinity retention/% |
|---|---|---|---|---|
| Example 1 | SZ1 | 61.2 | 23.95 | 39.13 |
| Example 2 | SZ2 | 59.6 | 22.36 | 37.52 |
| Example 3 | SZ3 | 62.8 | 23.12 | 36.82 |
| Comparative Example 1 | DZ1 | 60.1 | 4.3 | 7.15 |
| Comparative Example 2 | DZ2 | 56.2 | 4.8 | 8.54 |
| Comparative Example 3 | DZ3 | 55.9 | 16.9 | 30.23 |

It can be seen from Table 2 that the modified Y-type molecular sieve of the present application shows a relatively higher relative crystallinity retention after being aged in a bare state under severe conditions at 800° C. for 17 hours, indicating that the modified Y-type molecular sieve of the present application has a high hydrothermal stability.

Examples 6-10

The catalysts SC1, SC2, SC3, SC4 and SC5 obtained in Examples 1-5 were respectively aged at 800° C. in a 100% steam atmosphere for 4 or 17 hours, and then the micro-activity for light oils of the catalysts was evaluated. The results are shown in Table 3.

Evaluation of Micro-Activity for Light Oils:

The micro-activity for light oils of each catalyst was evaluated according to the standard method of RIPP 92-90 (see "Petrochemical Analysis Methods (RIPP Test Methods)", edited by Cuiding YANG et al., Science Press, September 1990, First Edition, pp. 263-268), in which the catalyst loading was 5.0 g, the reaction temperature was 460° C., and the feedstock oil was Dagang light diesel oil having a distillation range of 235-337° C. The composition of the product was analyzed by gas chromatography, and the micro-activity for light oils was calculated based on the composition of the product.

Micro-activity for light oils $(MA)$=(production of gasoline below 216° C.+gas production+coke production)/total amount of feed×100%.

Comparative Examples 4-6

The catalysts DC1, DC2 and DC3 obtained in Comparative Examples 1-3 were respectively aged at 800° C. in a 100% steam atmosphere for 4 or 17 hours, and then the micro-activity for light oils of the catalysts was evaluated in accordance with the method described in Examples 4-6. The results are shown in Table 3.

TABLE 3

Results of Examples 6-10 and Comparative Examples 4-6

| Example No. | Sample Name | MA (initial) (800° C./4 h) | MA (equilibrium) (800° C./17 h) | MA (equilibrium)/ MA (initial) |
|---|---|---|---|---|
| Example 6 | SC1 | 78 | 65 | 83.33 |
| Example 7 | SC2 | 77 | 63 | 81.82 |
| Example 8 | SC3 | 79 | 66 | 83.54 |
| Example 9 | SC4 | 72 | 58 | 80.55 |
| Example 10 | SC5 | 80 | 68 | 85.00 |
| Comparative Example 4 | DC1 | 41 | 18 | 43.90 |
| Comparative Example 5 | DC2 | 48 | 27 | 56.25 |
| Comparative Example 6 | DC3 | 78 | 55 | 70.51 |

Examples 11-15

Examples 11-15 illustrate the catalytic cracking performance of the catalysts comprising the modified Y-type molecular sieve according to the present application.

The catalysts SC1, SC2, SC3, SC4 and SC5 were aged at 800° C. under atmospheric pressure in a 100% steam atmosphere, and their catalytic cracking performances were evaluated on a small fixed fluidized bed reactor (ACE). Cracking gas and product oils were collected separately and analyzed by gas chromatography. The catalyst loading was 9 g, the reaction temperature was 500° C., the weight hourly space velocity was 16 h$^{-1}$, and the catalyst-to-oil weight ratio was shown in Table 5. The properties of the feedstock used in the ACE test are shown in Table 4, and the results are shown in Table 5.

Content of branched hydrocarbon in gasoline (wt %)=content of isoparaffin in gasoline (wt %)+content of branched alkene in gasoline (wt %).

Comparative Examples 7 to 9

Comparative Examples 7-9 illustrate catalytic cracking performance of the catalysts comprising the ultra-stable Y-type molecular sieve obtained in Comparative Examples 1-3.

The catalysts DC1, DC2 and DC3 were aged at 800° C. under atmospheric pressure in a 100% steam atmosphere, and their catalytic cracking performances were evaluated on a small fixed fluidized bed reactor (ACE) in accordance with the method described in Example 11. The properties of the feedstock oil used in the ACE test are shown in Table 4, and the results are shown in Table 5.

Reference Example 2

SZB1 was evaluated in accordance with the method described in Examples 11-15, and the results are shown in Table 5.

TABLE 4

Properties of the feedstock oil used in the ACE evaluation

| Name | WuHan-mixed-III-2007 |
|---|---|
| Density (20° C.)/(g · cm$^{-3}$) | 0.9104 |
| Viscosity (80° C.)/(mm$^2$/s) | 19.24 |
| Viscosity (100° C.)/(mm$^2$/s) | 11.23 |
| Condensation point/° C. | 40 |
| Carbon residue/wt % | 3.11 |
| Saturated hydrocarbons/wt % | 62.3 |
| Aromatics/wt % | 22.7 |
| Resin/wt % | 14.4 |
| Asphalt/wt % | 0.6 |
| Element mass fraction/% | |
| C | 86.9 |
| H | 12.63 |
| S | 0.61 |
| N | 0.2 |
| Distillation range (D1160)/° C. | |
| Initial boiling point | 267 |
| 5% | 318 |
| 10% | 339 |
| 30% | 407 |
| 50% | 451 |
| 70% | 494 |
| 81.5% | 540 |

TABLE 5

Results of Examples 11-15 and Comparative Examples 7-9

| Example No. | Ex. 11 | Ex. 12 | Ex. 13 | Ex. 14 | Ex. 15 | Comp. Ex. 7 | Comp. Ex. 8 | Comp. 9 | Ref. Ex. 2 |
|---|---|---|---|---|---|---|---|---|---|
| Sample Name | SC1 | SC2 | SC3 | SC4 | SC5 | DC1 | DC2 | DC3 | SCB1 |
| Molecular sieve used | SZ1 | SZ2 | SZ3 | SZ2 | SZ2 | DZ1 | DZ2 | DZ3 | SZB1 |
| Catalyst-to-oil ratio | 5 | 5 | 5 | 5 | 5 | 9 | 8 | 5 | 5 |
| Product distribution/wt % | | | | | | | | | |
| Dry gas | 1.25 | 1.2 | 1.31 | 1.15 | 1.35 | 1.55 | 1.41 | 1.33 | 1.39 |
| Liquefied gas | 15.72 | 15.53 | 16.04 | 15.85 | 16.73 | 16.86 | 15.02 | 15.48 | 15.87 |
| Coke | 4.51 | 4.69 | 4.4 | 4.08 | 4.95 | 8.33 | 7.51 | 6.43 | 4.48 |
| Gasoline | 52.8 | 53.9 | 52.18 | 51.84 | 53.9 | 38.55 | 44.08 | 50.69 | 45.29 |
| Light cycle oil | 17.36 | 17.92 | 17.12 | 18.55 | 16.72 | 20.17 | 20.08 | 17.65 | 25.35 |
| Heavy oil | 8.36 | 6.76 | 8.95 | 8.53 | 6.35 | 14.54 | 11.9 | 8.43 | 7.62 |
| Total | 100 | 100 | 100 | 100 | 100 | 100 | 100 | 100 | 100 |
| Conversion/wt % | 74.28 | 75.32 | 73.93 | 72.92 | 76.93 | 65.29 | 68.02 | 73.92 | 67.03 |
| Coke selectivity/wt % | 6.07 | 6.23 | 5.95 | 5.60 | 6.43 | 12.76 | 11.04 | 8.70 | 6.68 |
| Light oil yield/wt % | 70.16 | 71.82 | 69.3 | 70.39 | 70.62 | 58.72 | 64.16 | 68.34 | 70.64 |
| Total liquid yield/wt % | 85.88 | 87.35 | 85.34 | 86.24 | 87.35 | 75.58 | 79.18 | 83.82 | 86.51 |
| Content of branched hydrocarbon in gasoline/wt % | 39.35 | 40.02 | 39.25 | 39.02 | 41.43 | 36.70 | 37.86 | 36.57 | 35.86 |
| Content of monomethyl-branched hydrocarbon/wt % | 33.37 | 33.86 | 33.32 | 33.03 | 35.14 | 30.93 | 32.18 | 31.16 | 30.48 |

From the results listed in Tables 3 and 5, it can be seen that the catalytic cracking catalyst prepared by using the molecular sieve of the present application as an active component shows a very high hydrothermal stability, a significantly lower coke selectivity, and a significantly higher liquid yield, light oil yield, and gasoline yield, and the content of branched hydrocarbon in gasoline is also significantly higher and the content of monomethyl-branched hydrocarbon is high.

Example B1

2000 g of NaY molecular sieve (on a dry basis) was added into 20 L of decationized water and mixed uniformly under stirring, 689 ml of Ca(NO$_3$)$_2$ solution (with a concentration of 248 g/L calculated on the basis of CaO) was added, and the mixture was stirred, heated to a temperature of 90-95° C. and kept for 1 hour. Then, the mixture was filtered and washed, and the filter cake was dried at 120° C., to obtain a Y-type molecular sieve having a lattice constant of 2.471 nm, a sodium content of 6.6 wt % calculated on the basis of sodium oxide and a calcium content of 9.8 wt % calculated on the basis of CaO. Then, the resultant was roasted at 390° C. in an atmosphere comprising 50 vol % of steam and 50 vol % of air for 6 hours to obtain a Y-type molecular sieve having a lattice constant of 2.454 nm, and then dried to arrive at a water content of less than 1 wt %. After that, a gaseous SiCl$_4$ vaporized by heating was introduced at a weight ratio of SiCl$_4$:Y-type molecular sieve of 0.5:1, reacted at 400° C. for 2 hours, then washed with 20 L of decationized water, and filtered to obtain a modified Y-type molecular sieve of the present application, designated as BSZ1, of which the physicochemical properties are shown in Table B1.

After BSZ1 was aged in a bare state at 800° C. under atmospheric pressure in a 100% steam atmosphere for 17 hours, the relative crystallinity of the molecular sieve BSZ1 before and after aging was analyzed by XRD, and the relative crystallinity retention after aging was calculated. The results are shown in Table B2.

714.5 g of an alumina sol having an alumina content of 21 wt % was added to 1565.5 g of decationized water, stirring was started, and 2763 g of kaolin having a solid content of 76 wt % was added and dispersed for 60 minutes. 2049 g of pseudo-boehmite having an alumina content of 61 wt % was added into 8146 g of decationized water, 210 ml of hydrochloric acid with a mass concentration of 36% was added under stirring, and the slurry of dispersed kaolin was added after 60 minutes of acidification. Then, 1500 g (on a dry basis) of ground BSZ1 molecular sieve was added, uniformly mixed under stirring, then spray dried, washed, and dried to obtain a catalyst, designated as BSC1. The resulted BSC1 catalyst comprises, on a dry basis, 30 wt % of BSZ1 molecular sieve, 42 wt % of kaolin, 25 wt % of pseudo-boehmite and 3 wt % of alumina sol.

Example B2

2000 g of NaY molecular sieve (on a dry basis) was added into 25 L of decationized water and mixed uniformly under stirring, 734 ml of CaCl$_2$ solution (with a concentration of 248 g/L calculated on the basis of CaO) was added, and the mixture was stirred, heated to a temperature of 90-95° C. and kept for 1 hour. Then, the mixture was filtered and washed, and the filter cake was dried at 120° C., to obtain a Y-type molecular sieve having a lattice constant of 2.471 nm, a sodium content of 5.2 wt % calculated on the basis of sodium oxide and a calcium content of 8.7 wt % calculated on the basis of CaO. Then, the resultant was roasted at a temperature of 450° C. in an atmosphere of 80% steam for 5.5 hours to obtain a Y-type molecular sieve having a lattice constant of 2.460 nm, and then dried to arrive at a water content of less than 1 wt %. After that, a gaseous SiCl$_4$ vaporized by heating was introduced at a weight ratio of SiCl$_4$:Y-type molecular sieve of 0.6:1, reacted at 480° C. for 1.5 hours, then washed with 20 L of decationized water, and filtered to obtain a modified Y-type molecular sieve, designated as BSZ2, of which the physicochemical properties are shown in Table B1.

After BSZ2 was aged in a bare state at 800° C. under atmospheric pressure in a 100% steam atmosphere (aged in 100% steam for 17 hours means aged in an atmosphere of 100% steam for 17 hours), the crystallinity of the molecular sieve BSZ2 before and after aging was analyzed by XRD, and the relative crystallinity retention after aging was calculated. The results are shown in Table B2.

A microspherical catalyst, designated as BSC2, was prepared as described in Example B1 by forming a slurry of the BSZ2 molecular sieve, kaolin, water, a pseudo-boehmite binder, and alumina sol and spray drying, according to the conventional method for preparing catalytic cracking catalysts. The resulted BSC2 catalyst comprises, on a dry basis, 30 wt % of BSZ2 molecular sieve, 42 wt % of kaolin, 25 wt % of pseudo-boehmite and 3 wt % of alumina sol.

Example B3

2000 g of NaY molecular sieve (on a dry basis) was added into 22 L of decationized water and mixed uniformly under stirring, 428 ml of CaCl$_2$ solution (with a concentration of 248 g/L calculated on the basis of CaO) was added, and the mixture was stirred, heated to a temperature of 90-95° C., and kept for 1 hour under stirring. Then, the mixture was filtered and washed, and the filter cake was dried at 120° C., to obtain a Y-type molecular sieve having a lattice constant of 2.471 nm, a sodium content of 7.2 wt % calculated on the basis of sodium oxide and a calcium content of 4.8 wt % calculated on the basis of CaO. Then, the resultant was roasted at 470° C. in an atmosphere of 70 vol % steam for 5 hours to obtain a Y-type molecular sieve having a lattice constant of 2.457 nm, and then dried to arrive at a water content of less than 1 wt %. After that, a gaseous SiCl$_4$ vaporized by heating was introduced at a weight ratio of SiCl$_4$:Y-type molecular sieve of 0.4:1, reacted at 500° C. for 1 hours, then washed with 20 L of decationized water, and filtered to obtain a modified Y-type molecular sieve, designated as BSZ3, of which the physicochemical properties are shown in Table B1.

After BSZ3 was aged in a bare state at 800° C. under atmospheric pressure in a 100% steam atmosphere, the crystallinity of the molecular sieve BSZ3 before and after aging was analyzed by XRD, and the relative crystallinity retention after aging was calculated. The results are shown in Table B2.

A microspherical catalyst, designated as BSC3, was prepared by forming a slurry of the BSZ3 molecular sieve, kaolin, water, a pseudo-boehmite binder, and alumina sol and spray drying, according to the conventional method for preparing catalytic cracking catalysts (as described in Example B1). The resulted BSC3 catalyst comprises, on a dry basis, 30 wt % of BSZ3 molecular sieve, 42 wt % of kaolin, 25 wt % of pseudo-boehmite and 3 wt % of alumina sol.

Example B4

A microspherical catalyst, designated as BSC4, was prepared by forming a slurry of the BSZ2 molecular sieve, kaolin, water, a pseudo-boehmite binder, and alumina sol and spray drying, according to the conventional method for preparing catalytic cracking catalysts (as described in Example B1). The resulted BSC4 catalyst comprises, on a dry basis, 25 wt % of BSZ2 molecular sieve, 47 wt % of kaolin, 24 wt % of pseudo-boehmite and 4 wt % of alumina sol.

Example B5

A microspherical catalyst, designated as BSC5, was prepared by forming a slurry of the BSZ2 molecular sieve, kaolin, water, a pseudo-boehmite binder, and alumina sol and spray drying, according to the conventional method for preparing catalytic cracking catalysts (as described in Example B1). The resulted BSC5 catalyst comprises, on a dry basis, 40 wt % of BSZ2 molecular sieve, 30 wt % of kaolin, 20 wt % of pseudo-boehmite and 10 wt % of alumina sol.

Comparative Example B1

2000 g of NaY molecular sieve (on a dry basis) was added into 20 L of decationized water, mixed uniformly under stirring, 1000 g of $(NH_4)_2SO_4$ was added, and the mixture was stirred, heated to a temperature of 90-95° C., and kept for 1 hour. Then, after filtering and washing, the filter cake was dried at 120° C., and then subjected to a hydrothermal treatment by roasting at 650° C. in a 100% steam atmosphere for 5 hours. Then, the resultant was added into 20 L of decationized water, uniformly mixed under stirring, 1000 g of $(NH_4)_2SO_4$ was added, and the mixture was stirred, heated to a temperature of 90-95° C., and kept for 1 hour. Then, after filtering and washing, the filter cake was dried at 120° C., and then subjected to a second hydrothermal treatment by roasting at 650° C. in a 100% steam atmosphere for 5 hours, to obtain a hydrothermally ultra-stabilized Y-type molecular sieve free of calcium that has undergone two stages of ion-exchange and two stages of hydrothermal ultra-stabilization, designated as BDZ1, of which the physicochemical properties are shown in Table B1.

After BDZ1 was aged in a bare state at 800° C. under atmospheric pressure in a 100% steam atmosphere, the crystallinity of the molecular sieve BDZ1 before and after aging was analyzed by XRD, and the relative crystallinity retention after aging was calculated. The results are shown in Table B2.

A microspherical catalyst, designated as BDC1, was prepared by forming a slurry of the BDZ1 molecular sieve, kaolin, water, a pseudo-boehmite binder, and alumina sol and spray drying, according to the conventional method for preparing catalytic cracking catalysts (as described in Example B1). The resulted BDC1 catalyst comprises, on a dry basis, 30 wt % of BDZ1 molecular sieve, 42 wt % of kaolin, 25 wt % of pseudo-boehmite and 3 wt % of alumina sol.

Comparative Example B2

2000 g of NaY molecular sieve (on a dry basis) was added into 20 L of decationized water, mixed uniformly under stirring, 1000 g of $(NH_4)_2SO_4$ was added, and the mixture was stirred, heated to a temperature of 90-95° C., and kept for 1 hour. Then, after filtering and washing, the filter cake was dried at 120° C., and then subjected to a hydrothermal treatment by roasting at 650° C. in a 100% steam atmosphere for 5 hours. Then, the resultant was added into 20 L of decationized water, uniformly mixed under stirring, 406 ml of $Ca(NO_3)_2$ solution (with a concentration of 248 g/L calculated on the basis of CaO) and 900 g $(NH_4)_2SO_4$ were added, and the mixture was stirred, heated to a temperature of 90-95° C., and kept for 1 hour. Then, after filtering and washing, the filter cake was dried at 120° C., and then subjected to a second hydrothermal treatment by roasting at 650° C. in a 100% steam atmosphere for 5 hours, to obtain a hydrothermally ultra-stabilized calcium-containing Y-type molecular sieve that has undergone two stages of ion-exchange and two stages of hydrothermal ultra-stabilization, designated as BDZ2, of which the physicochemical properties are shown in Table B1.

After BDZ2 was aged in a bare state at 800° C. under atmospheric pressure in a 100% steam atmosphere, the crystallinity of the molecular sieve BDZ2 before and after aging was analyzed by XRD, and the relative crystallinity retention after aging was calculated. The results are shown in Table B2.

A microspherical catalyst, designated as BDC2, was prepared by forming a slurry of the BDZ2 molecular sieve, kaolin, water, a pseudo-boehmite binder, and alumina sol and spray drying, according to the conventional method for preparing catalytic cracking catalysts (as described in Example B1). The resulted BDC2 catalyst comprises, on a dry basis, 30 wt % of BDZ2 molecular sieve, 42 wt % of kaolin, 25 wt % of pseudo-boehmite and 3 wt % of alumina sol.

Comparative Example B3

2000 g of NaY molecular sieve (on a dry basis) was added into 20 L of decationized water and mixed uniformly under stirring, 486 ml of $Ca(NO_3)_2$ solution (with a concentration of 248 g/L calculated on the basis of CaO) was added, and the mixture was stirred, heated to a temperature of 90-95° C. and kept for 1 hour. Then, the mixture was filtered, washed and dried to arrive at a water content of less than 1 wt %. Then, the resultant was subjected to a gas phase ultra-stabilization by introducing gaseous $SiCl_4$ vaporized by heating at a weight ratio of $SiCl_4$:Y-type molecular sieve of 0.4:1, and reacting at 580° C. for 1.5 hours. The resultant was washed with 20 L of decationized water, and filtered to obtain a gas phase ultra-stabilized high-silica Y-type molecular sieve, designated as BDZ3, of which the physicochemical properties are shown in Table B1.

After BDZ3 was aged in a bare state at 800° C. under atmospheric pressure in a 100% steam atmosphere, the crystallinity of the molecular sieve BDZ3 before and after aging was analyzed by XRD, and the relative crystallinity retention after aging was calculated. The results are shown in Table B2.

A microspherical catalyst, designated as BDC3, was prepared by forming a slurry of the BDZ3 molecular sieve, kaolin, water, a pseudo-boehmite binder, and alumina sol and spray drying, according to the conventional method for preparing catalytic cracking catalysts (as described in Example B1). The resulted BDC3 catalyst comprises, on a dry basis, 30 wt % of BDZ3 molecular sieve, 42 wt % of kaolin, 25 wt % of pseudo-boehmite and 3 wt % of alumina sol.

TABLE B1

Properties of the molecular sieves obtained in Examples B1-B3 and Comparative Examples B1-B3

| Example No. | Ex. B1 | Ex. B2 | Ex. B3 | Comp. Ex. B1 | Comp. Ex. B2 | Comp. Ex. B3 |
|---|---|---|---|---|---|---|
| Sample Name | BSZ1 | BSZ2 | BSZ3 | BDZ1 | BDZ2 | BDZ3 |
| CaO content/wt % | 4.5 | 6 | 1.7 | 0 | 1.1 | 1.5 |
| $Na_2O$ content/wt % | 0.42 | 0.46 | 0.35 | 1.3 | 1.6 | 0.8 |
| Total $SiO_2/Al_2O_3$ molar ratio | 9.70 | 7.02 | 9.05 | 4.95 | 4.64 | 10.62 |
| Framework $SiO_2/Al_2O_3$ molar ratio | 11.95 | 8.13 | 10.87 | 10.39 | 7.55 | 11.39 |
| Framework aluminum/total aluminum × 100 | 81.2 | 86.3 | 83.2 | 47.59 | 61.4 | 93.2 |
| Non-framework aluminum/total aluminum × 100 | 18.8 | 13.7 | 16.8 | 52.41 | 38.6 | 6.8 |
| Lattice constant/nm | 2.443 | 2.452 | 2.445 | 2.446 | 2.454 | 2.444 |
| Relative crystallinity/% | 61 | 59.2 | 62.4 | 60.1 | 56 | 55.3 |
| Structure collapse temperature/° C. | 1045 | 1041 | 1053 | 1038 | 1010 | 1023 |
| Specific surface area/($m^2$/g) | 630 | 645 | 635 | 615 | 590 | 632 |
| Total pore volume/(ml/g) | 0.354 | 0.37 | 0.363 | 0.349 | 0.32 | 0.331 |
| Micropore volume/(ml/g) | 0.278 | 0.3 | 0.291 | 0.255 | 0.244 | 0.312 |
| Pore volume of secondary pores/(ml/g) | 0.076 | 0.07 | 0.072 | 0.094 | 0.076 | 0.019 |
| Proportion of pore volume of secondary pores (2.0-100 nm) to the total pore volume/% | 20.82 | 17.91 | 19.7 | 26.93 | 22.64 | 5.19 |
| B acid/L acid (total acid content ratio) | 2.42 | 3.47 | 3.04 | 0.75 | 2.2 | 3.68 |
| O1s Electron binding energy/eV | 532.45 | 532.40 | 532.48 | 532.76 | 532.66 | 532.73 |

It can be seen from Table B1, the modified Y-type molecular sieve of the present application has the following advantages: a low sodium content, a relatively lower non-framework aluminum content at a relatively higher silica-alumina ratio, a relatively higher proportion of the pore volume of secondary pores having a pore size of 2.0-100 nm to the total pore volume, a relatively higher B acid/L acid ratio (the ratio of total B acid content to total L acid content), a relatively higher crystallinity determined when the molecular sieve has a relatively smaller lattice constant and a certain magnesium content, and a high thermal stability.

TABLE B2

Hydrothermal stability of molecular sieves obtained in Examples B1-B3 and Comparative Examples B1-B3

| Example No. | Sample Name | Relative crystallinity of fresh molecular sieve sample (%) | Relative crystallinity of aged molecular sieve sample (%) (800° C./aged for 17 hours) | Relative crystallinity retention/% |
|---|---|---|---|---|
| Example B1 | BSZ1 | 61 | 23.92 | 39.21 |
| Example B2 | BSZ2 | 59.8 | 22.33 | 37.34 |
| Example B3 | BSZ3 | 62.9 | 23.11 | 36.74 |
| Comparative Example B1 | BDZ1 | 60.1 | 4.3 | 7.15 |
| Comparative Example B2 | BDZ2 | 56.5 | 4.6 | 8.14 |
| Comparative Example B3 | BDZ3 | 55.5 | 16.7 | 30.09 |

It can be seen from Table B2 that the modified Y-type molecular sieve of the present application shows a relatively higher relative crystallinity retention after being aged in a bare state under severe conditions at 800° C. for 17 hours, indicating that the modified Y-type molecular sieve of the present application has a high hydrothermal stability.

Examples B6-B10

The catalysts BSC1, BSC2, BSC3, BSC4 and BSC5 obtained in Examples B1-B5 were respectively aged at 800° C. in a 100% steam atmosphere for 4 or 17 hours, and then the micro-activity for light oils of the catalysts was evaluated. The results are shown in Table B3.

Evaluation of Micro-Activity for Light Oils:

The micro-activity for light oils of each catalyst was evaluated according to the standard method of RIPP 92-90 (see "Petrochemical Analysis Methods (RIPP Test Methods)", edited by Cuiding YANG et al., Science Press, September 1990, First Edition, pp. 263-268), in which the catalyst loading was 5.0 g, the reaction temperature was 460° C., and the feedstock oil was Dagang light diesel oil having a distillation range of 235-337° C. The composition of the product was analyzed by gas chromatography, and the micro-activity for light oils was calculated based on the composition of the product.

Micro-activity for light oils (MA)=(production of gasoline below 216° C.+gas production+coke production)/total amount of feed×100%.

Comparative Examples B4-B6

The catalysts BDC1, BDC2 and BDC3 obtained in Comparative Examples B1-B3 were respectively aged at 800° C. in a 100% steam atmosphere for 4 or 17 hours, and then the micro-activity for light oils of the catalysts was evaluated in accordance with the method described in Example B6. The results are shown in Table B3.

TABLE B3

Results of Example B6-B10 and Comparative Examples B4-B6

| Example No. | Sample Name | MA (initial) (800° C./4 h) | MA (equilibrium) (800° C./17 h) | MA (equilibrium)/ MA (initial) |
|---|---|---|---|---|
| Example B6 | BSC1 | 77 | 65 | 84.42 |
| Example B7 | BSC2 | 76 | 61 | 80.26 |
| Example B8 | BSC3 | 78 | 65 | 83.33 |
| Example B9 | BSC4 | 72 | 57 | 79.17 |
| Example B10 | BSC5 | 79 | 68 | 86.08 |
| Comparative Example B4 | BDC1 | 41 | 18 | 43.90 |
| Comparative Example B5 | BDC2 | 46 | 23 | 50.00 |
| Comparative Example B6 | BDC3 | 76 | 52 | 68.42 |

Examples B11-B15

Examples B11-B15 illustrate the catalytic cracking performance of the catalysts comprising the modified Y-type molecular sieve according to the present application.

The catalysts BSC1, BSC2, BSC3, BSC4 and BSC5 were aged at 800° C. under atmospheric pressure in a 100% steam atmosphere, and their catalytic cracking performances were evaluated on a small fixed fluidized bed reactor (ACE). Cracking gas and product oils were collected separately and analyzed by gas chromatography. The catalyst loading was 9 g, the reaction temperature was 500° C., the weight hourly space velocity was 16 $h^{-1}$, and the catalyst-to-oil weight ratio was shown in Table B5. The properties of the feedstock oil used in the ACE test are shown in Table B4, and the results are shown in Table B5.

Content of branched hydrocarbon in gasoline (wt %)=content of isoparaffin in gasoline (wt %)+content of branched alkene in gasoline (wt %).

Content of dimethyl-branched hydrocarbon (wt %)=content of dimethylated isoparaffin (wt %)+content of dimethyl-branched alkene (wt %).

Comparative Examples B7-B9

Comparative Examples B7-B9 illustrate catalytic cracking performance of the catalysts comprising the ultra-stable Y-type molecular sieve obtained in Comparative Examples B1-B3.

The catalysts BDC1, BDC2 and BDC3 were aged at 800° C. under atmospheric pressure in 100% steam atmosphere, and their catalytic cracking performances were evaluated on a small fixed fluidized bed reactor (ACE) in accordance with the method described in Example B11. The properties of the feedstock oil used in the ACE test are shown in Table B4, and the results are shown in Table B5.

TABLE B4

Properties of the feedstock oil used in the ACE evaluation

| Name | WuHan-mixed-III-2007 |
|---|---|
| Density (20° C.)/(g · $cm^{-3}$) | 0.9104 |
| Viscosity (80° C.)/($mm^2$/s) | 19.24 |
| Viscosity (100° C.)/($mm^2$/s) | 11.23 |
| Condensation point/° C. | 40 |
| Carbon residue/wt % | 3.11 |
| Saturated hydrocarbons/wt % | 62.3 |
| Aromatics/wt % | 22.7 |
| Resin/wt % | 14.4 |
| Asphalt/wt % | 0.6 |
| Element mass fraction/% | |
| C | 86.9 |
| H | 12.63 |
| S | 0.61 |
| N | 0.2 |
| Distillation range (D1160)/° C. | |
| Initial boiling point | 267 |
| 5% | 318 |
| 10% | 339 |
| 30% | 407 |
| 50% | 451 |
| 70% | 494 |
| 81.5% | 540 |

TABLE B5

Results of Example B11-B15 and Comparative Examples B7-B9

| Example No. | Ex. B11 | Ex. B12 | Ex. B13 | Ex. B14 | Ex. B15 | Comp. Ex. B7 | Comp. Ex. B8 | Comp. Ex. B9 |
|---|---|---|---|---|---|---|---|---|
| Sample Name | BSC1 | BSC2 | BSC3 | BSC4 | BSC5 | BDC1 | BDC2 | BDC3 |
| Molecular sieve used | BSZ1 | BSZ2 | BSZ3 | BSZ2 | BSZ2 | BDZ1 | BDZ2 | BDZ3 |
| Catalyst-to-oil ratio | 5 | 5 | 5 | 5 | 5 | 9 | 8 | 5 |
| Product distribution/wt % | | | | | | | | |
| Dry gas | 1.28 | 1.18 | 1.33 | 1.1 | 1.41 | 1.55 | 1.45 | 1.36 |
| Liquefied gas | 15.64 | 15.45 | 16.01 | 15.01 | 17.43 | 16.86 | 15.05 | 15.53 |
| Coke | 4.34 | 4.56 | 4.36 | 4.35 | 4.68 | 8.33 | 7.48 | 6.39 |
| Gasoline | 51.9 | 53.8 | 52.24 | 51.93 | 53.94 | 38.55 | 44.86 | 50.98 |
| Light cycle oil | 17.59 | 17.91 | 17.54 | 18.64 | 16.16 | 20.17 | 20.22 | 17.83 |
| Heavy oil | 9.25 | 7.1 | 8.52 | 8.97 | 6.38 | 14.54 | 10.94 | 7.91 |
| Total | 100 | 100 | 100 | 100 | 100 | 100 | 100 | 100 |
| Conversion/wt % | 73.16 | 74.99 | 73.94 | 72.39 | 77.46 | 65.29 | 68.84 | 74.26 |
| Coke selectivity/wt % | 5.93 | 6.08 | 5.90 | 6.01 | 6.04 | 12.76 | 10.87 | 8.60 |
| Light oil yield/wt % | 69.49 | 71.71 | 69.78 | 70.57 | 70.1 | 58.72 | 65.08 | 68.81 |
| Total liquid yield/wt % | 85.13 | 87.16 | 85.79 | 85.58 | 87.53 | 75.58 | 80.13 | 84.34 |
| Content of branched hydrocarbon in gasoline/wt % | 40.62 | 41.04 | 40.21 | 39.51 | 42.48 | 36.70 | 37.83 | 36.91 |
| Content of dimethyl-branched hydrocarbon/wt % | 7.4 | 7.65 | 7.25 | 7.24 | 7.91 | 5.5 | 5.91 | 6.01 |

TABLE B5-continued

Results of Example B11-B15 and Comparative Examples B7-B9

| Example No. | Ex. B11 | Ex. B12 | Ex. B13 | Ex. B14 | Ex. B15 | Comp. Ex. B7 | Comp. Ex. B8 | Comp. Ex. B9 |
|---|---|---|---|---|---|---|---|---|
| Content of dimethyl-branched hydrocarbon/content of monomethyl-branched hydrocarbon in gasoline | 0.226 | 0.232 | 0.22 | 0.227 | 0.231 | 0.178 | 0.187 | 0.196 |

From the results listed in Tables B3 and B5, it can be seen that the catalytic cracking catalyst prepared by using the molecular sieve of the present application as an active component shows a very high hydrothermal stability, a significantly lower coke selectivity, and a significantly higher liquid yield, light oil yield, and gasoline yield, the content of branched hydrocarbon and dimethyl-branched hydrocarbon in gasoline is also significantly higher, and the ratio of content of dimethyl-branched hydrocarbon/content of monomethyl-branched hydrocarbon in gasoline is also improved.

In the above description, the concept of the present application has been described with reference to the embodiments. However, it will be understood by those skilled in the art that various modifications and changes can be made without departing from the scope of the present invention defined in the appended claims. Accordingly, the description and drawings should be regarded as illustrative rather than limiting, and all such modifications and changes are covered by the present invention.

It is to be understood that some of the features described separately in a plurality of embodiments for the sake of clarity may also be provided as a combination in a single embodiment. Conversely, a plurality of different features that are described in a single embodiment for the sake of brevity may also be provided separately or in any sub-combination in different embodiments.

The invention claimed is:

1. A modified Y-type molecular sieve, having a modifying metal content of 0.5-6.3 wt %, calculated on the basis of an oxide of the modifying metal, and a sodium content of no more than 0.5 wt %, calculated on the basis of sodium oxide, on a dry basis and based on the weight of said modified Y-type molecular sieve, said modifying metal being magnesium, calcium, or a combination thereof; wherein the modified Y-type molecular sieve has a proportion of non-framework aluminum content to the total aluminum content of no more than 20%, a total pore volume of 0.33-0.39 ml/g, a proportion of the pore volume of secondary pores having a pore size of 2-100 nm to the total pore volume of 10-25%, a lattice constant of 2.440-2.455 nm, a lattice collapse temperature of not lower than 1040° C., and a ratio of B acid to L acid in the total acid content of no less than 2.30, as determined by pyridine adsorption infrared spectroscopy at 200° C.

2. The modified Y-type molecular sieve according to claim 1, wherein the modified Y-type molecular sieve has a proportion of the pore volume of secondary pores having a pore size of 2-100 nm to the total pore volume of 15-21%.

3. The modified Y-type molecular sieve according to claim 2, wherein the modified Y-type molecular sieve has a proportion of non-framework aluminum content to the total aluminum content of 13-19%, and a framework silica-alumina ratio, calculated as $SiO_2/Al_2O_3$ molar ratio, of 7.3-14.

4. The modified Y-type molecular sieve according to claim 1, wherein the modified Y-type molecular sieve has a lattice collapse temperature of 1040-1080° C.

5. The modified Y-type molecular sieve according to claim 4, wherein the modified Y-type molecular sieve has a ratio of B acid to L acid in the total acid content of 2.3-5.0, as determined by pyridine adsorption infrared spectroscopy at 200° C.

6. The modified Y-type molecular sieve according to claim 1, wherein the modified Y-type molecular sieve has a relative crystalline retention of 33% or more after aging at 800° C. under atmospheric pressure in a 100% steam atmosphere for 17 hours.

7. The modified Y-type molecular sieve according to claim 1, wherein the modifying metal is magnesium, and the modified Y-type molecular sieve has a magnesium content of 0.5-4.5 wt %, calculated on the basis of magnesium oxide, a sodium content of 0.2-0.5 wt %, calculated on the basis of sodium oxide, a lattice constant of 2.442-2.452 nm, and a framework silica-alumina ratio of 8.4-12.6, calculated as $SiO_2/Al_2O_3$ molar ratio; or
the modifying metal is calcium, and the modified Y-type molecular sieve has a calcium content of 0.7-6.3 wt %, calculated on the basis of calcium oxide, a sodium content of 0.2-0.5 wt %, calculated on the basis of sodium oxide, a lattice constant of 2.442-2.452 nm, and a framework silica-alumina ratio of 8.0-12.6, calculated as $SiO_2/Al_2O_3$ molar ratio.

8. The modified Y-type molecular sieve according to claim 1, wherein the modified Y-type molecular sieve has an O1s electron binding energy of no greater than 532.55 eV.

9. The modified Y-type molecular sieve according to claim 1, wherein the modified Y-type molecular sieve has a relative crystallinity of 58-75%.

10. A method for preparing a modified Y-type molecular sieve according to claim 1, comprising the steps of:
(1) contacting a NaY molecular sieve with a solution of a soluble magnesium salt, a soluble calcium salt, or a combination thereof for ion exchange reaction to obtain a Y-type molecular sieve comprising magnesium, calcium, or a combination thereof with reduced sodium content;
(2) subjecting the Y-type molecular sieve obtained in step (1) to roasting at a temperature of 350-480° C. in an atmosphere of 30-90 vol % of steam for 4.5-7 hours, and optionally drying, to obtain a Y-type molecular sieve with reduced lattice constant; and
(3) contacting the Y-type molecular sieve with reduced lattice constant with gaseous silicon tetrachloride for reaction at a weight ratio of $SiCl_4$ to the Y-type molecular sieve with reduced lattice constant, on a dry basis, of 0.1:1 to 0.7:1, at a reaction temperature of 200-650° C. for a reaction time of 10 minutes to 5 hours, to obtain the modified Y-type molecular sieve.

11. The method according to claim 10, wherein the Y-type molecular sieve obtained in step (1) has a lattice constant of 2.465-2.472 nm, and a sodium content of no more than 8.8 wt %, calculated on the basis of sodium oxide.

12. The method according to claim 11, wherein the Y-type molecular sieve obtained in step (1) has a magnesium content of 0.5-7.0 wt %, calculated on the basis of MgO, a sodium content of 4-8.8 wt %, calculated on the basis of sodium oxide, and a lattice constant of 2.465-2.472 nm; or the Y-type molecular sieve obtained in step (1) has a calcium content of 0.8-10 wt %, calculated on the basis of CaO, a sodium content of 4-8.8 wt %, calculated on the basis of sodium oxide, and a lattice constant of 2.465-2.472 nm.

13. The method according to claim 10, wherein in step (1), the NaY molecular sieve, the soluble magnesium salt, the soluble calcium salt, and water are mixed at a weight ratio of the NaY molecular sieve:the total of the soluble magnesium salt and the soluble calcium salt:$H_2O$ of 1:0.005-0.28:5-15 for ion exchange.

14. The method according to claim 10, wherein step (1) further comprises mixing the NaY molecular sieve with water, and adding thereto a soluble magnesium salt, a soluble calcium salt, a solution of a soluble calcium salt, or a solution of a soluble magnesium salt under stirring to conduct an ion exchange reaction at an exchange temperature of 15-95° C. for an exchange time of 30-120 minutes.

15. The method according to claim 14, wherein the soluble magnesium salt is magnesium chloride, magnesium nitrate, or a combination thereof, and the soluble calcium salt is calcium chloride, calcium nitrate, or a combination thereof.

16. The method according to claim 10, wherein in step (2), the roasting temperature is 380-470° C., the roasting atmosphere is an atmosphere of 40-80% steam, and the roasting time is 5-6 hours.

17. The method according to claim 10, wherein step (3) further comprises washing the modified Y-type molecular sieve with water under conditions including: a ratio of molecular sieve:$H_2O$ of 1:5-20, a pH of 2.5-5.0, and a washing temperature of 30-60° C.

18. The method according to claim 10, wherein the Y-type molecular sieve with reduced lattice constant obtained in step (2) has a lattice constant of 2.450-2.462 nm and a water content of no more than 1 wt %.

19. A catalytic cracking catalyst, comprising 10-50 wt %, on a dry basis, of a modified Y-type molecular sieve, 10-40 wt % of an alumina binder, calculated on the basis of alumina, and 10-80 wt %, on a dry basis, of a clay, based on the weight of the catalytic cracking catalyst; wherein the modified Y-type molecular sieve is a modified Y-type molecular sieve according to claim 1.

20. A method for catalytic cracking of hydrocarbon oils, comprising contacting a hydrocarbon oil with a catalytic cracking catalyst comprising the modified Y-type molecular sieve according to claim 1.

* * * * *